United States Patent
Chan et al.

(10) Patent No.: US 12,418,327 B2
(45) Date of Patent: *Sep. 16, 2025

(54) SYSTEMS AND METHODS FOR MACHINE LEARNING ZONE-BASED FOREIGN OBJECT DETECTION FOR WIRELESS POWER TRANSMISSION

(71) Applicant: Energous Corporation, San Jose, CA (US)

(72) Inventors: Howard Chan, San Jose, CA (US); Deepak Jain, San Ramon, CA (US)

(73) Assignee: ENERGOUS CORPORATION, San Jose, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/522,082

(22) Filed: Nov. 28, 2023

(65) Prior Publication Data

US 2024/0171218 A1   May 23, 2024

Related U.S. Application Data

(63) Continuation of application No. 17/831,037, filed on Jun. 2, 2022, now Pat. No. 11,831,361, which is a
(Continued)

(51) Int. Cl.
*H02J 50/60* (2016.01)
*H02J 50/20* (2016.01)
(Continued)

(52) U.S. Cl.
CPC ............... *H04B 5/79* (2024.01); *H02J 50/20* (2016.02); *H02J 50/402* (2020.01); *H02J 50/60* (2016.02)

(58) Field of Classification Search
CPC .. H02J 50/20; H02J 50/23; H02J 50/40; H02J 50/402; H02J 50/60; H02J 50/80
See application file for complete search history.

(56) References Cited

U.S. PATENT DOCUMENTS 787,412 A    4/1905 Tesla
2,811,624 A   10/1957 Haagensen
(Continued)

FOREIGN PATENT DOCUMENTS

CN    101496222 A   7/2009
CN    201278367 Y   7/2009
(Continued)

OTHER PUBLICATIONS

Energous Corp., IPRP, PCT/US2014/040697, Dec. 8, 2015, 9 pgs.
(Continued)

*Primary Examiner* — Levi Gannon
(74) *Attorney, Agent, or Firm* — Perkins Coie LLP; Colin Fowler

(57) ABSTRACT

An example method is provided for detecting and classifying foreign objects. The method includes after a predetermined period of time, for a zone of a plurality of zones, enabling a beacon signal, obtaining a set of electrical measurements, and disabling the beacon signal. The method also includes determining, based on the set of electrical measurements and a trained classifier, a status of the zone. The status of the zone indicates whether there is a presence of foreign objects within the zone of the plurality of zones. The method further includes in accordance with an indication that there is the presence of the foreign objects, forgo transmitting wireless power to one or more wireless power receivers. The method further includes in accordance with an indication that there is an absence of the foreign objects, transmitting wireless power to the one or more wireless power receivers.

20 Claims, 18 Drawing Sheets

Related U.S. Application Data continuation of application No. 17/026,196, filed on Sep. 19, 2020, now Pat. No. 11,381,118.

(60) Provisional application No. 62/903,674, filed on Sep. 20, 2019.

(51) Int. Cl.
 *H02J 50/40* (2016.01)
 *H04B 5/79* (2024.01)

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,663,555 B2 | 2/2010 | Caimi et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Itoh et al. |
| 7,925,308 B2 | 4/2011 | Greene et al. |
| 7,948,208 B2 | 5/2011 | Partovi et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 10/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Ungari et al. |
| 8,629,576 B2 | 1/2014 | Levine |
| 8,653,966 B2 | 2/2014 | Rao et al. |
| 8,655,272 B2 | 2/2014 | Saunamäki |
| 8,674,551 B2 | 3/2014 | Low et al. |

(56) References Cited

U.S. PATENT DOCUMENTS

| | | |
|---|---|---|
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,564 B2 | 10/2017 | Leabman |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,692 B1 | 12/2017 | Bell et al. |
| 9,859,756 B2 | 1/2018 | Leabman et al. |
| 9,859,758 B1 | 1/2018 | Leabman |
| 9,866,279 B2 | 1/2018 | Bell et al. |
| 9,867,032 B2 | 1/2018 | Verma et al. |
| 9,871,301 B2 | 1/2018 | Contopanagos |
| 9,876,380 B1 | 1/2018 | Leabman et al. |
| 9,876,394 B1 | 1/2018 | Leabman |
| 9,876,536 B1 | 1/2018 | Bell et al. |
| 9,876,648 B2 | 1/2018 | Bell |
| 9,882,394 B1 | 1/2018 | Bell et al. |
| 9,882,427 B2 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,554 B2 | 2/2018 | Bell et al. |
| 9,893,555 B1 | 2/2018 | Leabman et al. |
| 9,893,564 B2 | 2/2018 | De Rochemont |
| 9,899,744 B1 | 2/2018 | Contopanagos et al. |
| 9,899,844 B1 | 2/2018 | Bell et al. |
| 9,899,861 B1 | 2/2018 | Leabman et al. |
| 9,899,873 B2 | 2/2018 | Bell et al. |
| 9,912,199 B2 | 3/2018 | Leabman et al. |
| 9,916,485 B1 | 3/2018 | Lilly et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,941,747 B2 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,008,777 B1 | 6/2018 | Broyde et al. |
| 10,008,889 B2 | 6/2018 | Bell et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,063,105 B2 | 8/2018 | Leabman |
| 10,063,106 B2 | 8/2018 | Bell et al. |
| 10,068,703 B1 | 9/2018 | Contopanagos |
| 10,075,008 B1 | 9/2018 | Bell et al. |
| 10,075,017 B2 | 9/2018 | Leabman et al. |
| 10,079,515 B2 | 9/2018 | Hosseini et al. |
| 10,090,699 B1 | 10/2018 | Leabman |
| 10,090,714 B2 | 10/2018 | Bohn et al. |
| 10,090,886 B1 | 10/2018 | Bell et al. |
| 10,103,552 B1 | 10/2018 | Leabman et al. |
| 10,103,582 B2 | 10/2018 | Leabman et al. |
| 10,110,046 B1 | 10/2018 | Esquibel et al. |
| 10,122,219 B1 | 11/2018 | Hosseini et al. |
| 10,122,415 B2 | 11/2018 | Bell et al. |

(56) References Cited

U.S. PATENT DOCUMENTS

| | | |
|---|---|---|
| 10,124,754 B1 | 11/2018 | Leabman |
| 10,128,686 B1 | 11/2018 | Leabman et al. |
| 10,128,693 B2 | 11/2018 | Bell et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,286 B2 | 11/2018 | Hosseini et al. |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Leabman |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,056 B2 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,192 B1 | 5/2019 | Rappaport |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,355,534 B2 | 7/2019 | Johnston et al. |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,483,768 B2 | 11/2019 | Bell et al. |
| 10,490,346 B2 | 11/2019 | Contopanagos |
| 10,491,029 B2 | 11/2019 | Hosseini |
| 10,498,144 B2 | 12/2019 | Leabman et al. |
| 10,511,097 B2 | 12/2019 | Kornaros et al. |
| 10,511,196 B2 | 12/2019 | Hosseini |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,594,165 B2 | 3/2020 | Hosseini |
| 10,615,647 B2 | 4/2020 | Johnston et al. |
| 10,680,319 B2 | 6/2020 | Hosseini et al. |
| 10,714,984 B2 | 7/2020 | Hosseini et al. |
| 10,734,717 B2 | 8/2020 | Hosseini |
| 10,778,041 B2 | 9/2020 | Leabman |
| 10,790,674 B2 | 9/2020 | Bell et al. |
| 10,840,743 B2 | 11/2020 | Johnston et al. |
| 10,879,740 B2 | 12/2020 | Hosseini |
| 10,923,954 B2 | 2/2021 | Leabman |
| 10,958,095 B2 | 3/2021 | Leabman et al. |
| 10,985,617 B1 | 4/2021 | Johnston et al. |
| 11,011,942 B2 | 5/2021 | Liu |
| 11,139,699 B2 | 10/2021 | Johnston et al. |
| 11,381,118 B2 | 7/2022 | Chan et al. |
| 11,451,096 B2 | 9/2022 | Hoss |
| 11,710,987 B2 | 7/2023 | Johnston et al. |
| 11,715,980 B2 | 8/2023 | Johnston et al. |
| 11,831,361 B2 | 11/2023 | Chan et al. |
| 11,863,001 B2 | 1/2024 | Hoss |
| 2002/0065052 A1 | 5/2002 | Pande et al. |
| 2002/0103447 A1 | 8/2002 | Terry |
| 2002/0171594 A1 | 11/2002 | Fang |
| 2003/0038750 A1 | 2/2003 | Chen |
| 2003/0058187 A1 | 3/2003 | Billiet et al. |
| 2004/0020100 A1 | 2/2004 | O'Brien et al. |
| 2004/0130425 A1 | 7/2004 | Dayan et al. |
| 2004/0130442 A1 | 7/2004 | Breed |
| 2004/0145342 A1 | 7/2004 | Lyon |
| 2004/0155832 A1 | 8/2004 | Yuanzhu |
| 2004/0207559 A1 | 10/2004 | Milosavljevic |
| 2004/0259604 A1 | 12/2004 | Mickle et al. |
| 2005/0007276 A1 | 1/2005 | Barrick et al. |
| 2005/0116683 A1 | 6/2005 | Cheng |
| 2005/0117660 A1 | 6/2005 | Vialle et al. |
| 2005/0134517 A1 | 6/2005 | Gottl |
| 2005/0227619 A1 | 10/2005 | Lee et al. |
| 2005/0237258 A1 | 10/2005 | Abramov et al. |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0132360 A1 | 6/2006 | Caimi et al. |
| 2006/0160517 A1 | 7/2006 | Yoon |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0281423 A1 | 12/2006 | Caimi et al. |
| 2006/0284593 A1 | 12/2006 | Nagy et al. |
| 2007/0007821 A1 | 1/2007 | Rossetti |
| 2007/0019693 A1 | 1/2007 | Graham |
| 2007/0021140 A1 | 1/2007 | Keyes, IV et al. |
| 2007/0060185 A1 | 3/2007 | Simon et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0210960 A1 | 9/2007 | Rofougaran et al. |

(56) References Cited

U.S. PATENT DOCUMENTS

| | | |
|---|---|---|
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0122297 A1 | 5/2008 | Arai |
| 2008/0123383 A1 | 5/2008 | Shionoiri |
| 2008/0169910 A1 | 7/2008 | Greene et al. |
| 2008/0197802 A1 | 8/2008 | Onishi |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0174604 A1 | 7/2009 | Keskitalo |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0281678 A1 | 11/2009 | Wakamatsu |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0312046 A1 | 12/2009 | Clevenger et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019908 A1 | 1/2010 | Cho et al. |
| 2010/0033021 A1 | 2/2010 | Bennett |
| 2010/0034238 A1 | 2/2010 | Bennett |
| 2010/0044123 A1 | 2/2010 | Perlman et al. |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0087227 A1 | 4/2010 | Francos et al. |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0309088 A1 | 12/2010 | Hyvonen et al. |
| 2010/0315045 A1 | 12/2010 | Zeine |
| 2010/0321086 A1 | 12/2010 | See et al. |
| 2010/0328044 A1 | 12/2010 | Waffenschmidt et al. |
| 2011/0009057 A1 | 1/2011 | Saunamäki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0109167 A1 | 5/2011 | Park et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133691 A1 | 6/2011 | Hautanen |
| 2011/0151789 A1 | 6/2011 | Viglione et al. |
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0175455 A1 | 7/2011 | Hashiguchi |

(56) References Cited

U.S. PATENT DOCUMENTS

| | | |
|---|---|---|
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0227725 A1 | 9/2011 | Muirhead |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Wildmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086281 A1 | 4/2012 | Kanno |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Alexander |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 7/2012 | Huggins et al. |
| 2012/0188142 A1 | 7/2012 | Shashi et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jain et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tamai et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Nergaard et al. |
| 2013/0057364 A1 | 3/2013 | Kesler et al. |

(56) References Cited

U.S. PATENT DOCUMENTS

| | | |
|---|---|---|
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Miroshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0223538 A1 | 8/2013 | Wang et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak, III et al. |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001608 A1 | 1/2014 | McPartlin |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008993 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0024325 A1 | 1/2014 | Iun et al. |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0111156 A1 | 4/2014 | Lee et al. |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0152251 A1 | 6/2014 | Kim et al. |
| 2014/0159646 A1 | 6/2014 | Sankar et al. |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |

(56) References Cited

U.S. PATENT DOCUMENTS

| | | |
|---|---|---|
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wynne et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225452 A1 | 8/2014 | Kozaki et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375258 A1 | 12/2014 | Arkhipenkov |
| 2014/0375261 A1 | 12/2014 | Manova-Elssibony et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Jurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0021990 A1 | 1/2015 | Myer et al. |
| 2015/0022008 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wik et al. |
| 2015/0028688 A1 | 1/2015 | Masaoka |
| 2015/0028694 A1 | 1/2015 | Leabman et al. |
| 2015/0028697 A1 | 1/2015 | Makino et al. |
| 2015/0028875 A1 | 1/2015 | Irie et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fujinaga |
| 2015/0041459 A1 | 2/2015 | Leabman et al. |
| 2015/0042265 A1 | 2/2015 | Leabman et al. |
| 2015/0042287 A1 | 2/2015 | Liu et al. |
| 2015/0044977 A1 | 2/2015 | Ramasamy et al. |
| 2015/0046526 A1 | 2/2015 | Bush et al. |
| 2015/0051750 A1 | 2/2015 | Kurs et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Arai et al. |
| 2015/0115878 A1 | 4/2015 | Park |
| 2015/0116153 A1 | 4/2015 | Chen et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288214 A1 | 10/2015 | Borngraber |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |

(56) References Cited

U.S. PATENT DOCUMENTS

| | | |
|---|---|---|
| 2015/0333528 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013661 A1 | 1/2016 | Kurs et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043571 A1 | 2/2016 | Kesler et al. |
| 2016/0043572 A1 | 2/2016 | Cooper et al. |
| 2016/0054440 A1 | 2/2016 | Younis |
| 2016/0056635 A1 | 2/2016 | Bell |
| 2016/0056640 A1 | 2/2016 | Mao |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094074 A1 | 3/2016 | Alves et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099611 A1 | 4/2016 | Leabman et al. |
| 2016/0099612 A1 | 4/2016 | Leabman et al. |
| 2016/0099614 A1 | 4/2016 | Leabman et al. |
| 2016/0099755 A1 | 4/2016 | Leabman et al. |
| 2016/0099757 A1 | 4/2016 | Leabman et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0174162 A1 | 6/2016 | Nadakuduti et al. |
| 2016/0174293 A1 | 6/2016 | Mow et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0182127 A1 | 6/2016 | Karandikar et al. |
| 2016/0197522 A1 | 7/2016 | Zeine et al. |
| 2016/0202343 A1 | 7/2016 | Okutsu |
| 2016/0204642 A1 | 7/2016 | Oh |
| 2016/0204643 A1 | 7/2016 | Manova-Elssibony |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0325680 A1 | 11/2016 | Curtis et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0033611 A1 | 2/2017 | Shin et al. |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077765 A1 | 3/2017 | Bell et al. |
| 2017/0077979 A1 | 3/2017 | Papa et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110886 A1 | 4/2017 | Reynolds et al. |
| 2017/0110910 A1 | 4/2017 | Zeine et al. |
| 2017/0117756 A1 | 4/2017 | Muratov |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0141622 A1 | 5/2017 | Meichle |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0179771 A1 | 6/2017 | Leabman |
| 2017/0187244 A1 | 6/2017 | Su |
| 2017/0187422 A1 | 6/2017 | Hosseini |
| 2017/0212210 A1 | 7/2017 | Chen et al. |
| 2017/0214422 A1 | 7/2017 | Na et al. |
| 2017/0274787 A1 | 9/2017 | Salter et al. |
| 2017/0285207 A1 | 10/2017 | Shao et al. |
| 2017/0338695 A1 | 11/2017 | Port |
| 2018/0006611 A1 | 1/2018 | de Jong et al. |
| 2018/0012082 A1 | 1/2018 | Satazoda et al. |
| 2018/0040929 A1 | 2/2018 | Chappelle |
| 2018/0048178 A1 | 2/2018 | Leabman |
| 2018/0090992 A1 | 3/2018 | Shrivastava et al. |
| 2018/0166924 A1 | 6/2018 | Hosseini |
| 2018/0166925 A1 | 6/2018 | Hosseini |
| 2018/0205265 A1 | 7/2018 | Park et al. |
| 2018/0219428 A1 | 8/2018 | Bae |
| 2018/0226840 A1 | 8/2018 | Leabman |
| 2018/0227018 A1 | 8/2018 | Moshfeghi |
| 2018/0241255 A1 | 8/2018 | Leabman |
| 2018/0248409 A1 | 8/2018 | Johnston |
| 2018/0262050 A1 | 9/2018 | Yankowitz |
| 2018/0262060 A1 | 9/2018 | Johnston |
| 2018/0301934 A1 | 10/2018 | Prabhala et al. |
| 2018/0309314 A1 | 10/2018 | White, II et al. |
| 2018/0331581 A1 | 11/2018 | Hosseini |
| 2018/0343040 A1 | 11/2018 | Luzinski et al. |
| 2018/0368065 A1 | 12/2018 | Sarkas et al. |
| 2018/0375368 A1 | 12/2018 | Leabman et al. |
| 2018/0376235 A1 | 12/2018 | Leabman |
| 2019/0052979 A1 | 2/2019 | Chen et al. |
| 2019/0074722 A1 | 3/2019 | Shahsavari et al. |
| 2019/0074728 A1 | 3/2019 | Leabman |
| 2019/0074730 A1 | 3/2019 | Shahsavari et al. |
| 2019/0074862 A1 | 3/2019 | Wang et al. |
| 2019/0089396 A1 | 3/2019 | Kim et al. |
| 2019/0130215 A1 | 5/2019 | Kaestle et al. |
| 2019/0131827 A1 | 5/2019 | Johnston |
| 2019/0207570 A1 | 7/2019 | Govindaraj |
| 2019/0245389 A1 | 8/2019 | Johnston et al. |
| 2019/0288567 A1 | 9/2019 | Kabiri et al. |
| 2019/0296586 A1 | 9/2019 | Moshfeghi |
| 2019/0326782 A1 | 10/2019 | Graham et al. |
| 2019/0363588 A1 | 11/2019 | Daetwyler et al. |
| 2019/0372384 A1 | 12/2019 | Hosseini et al. |
| 2019/0386522 A1 | 12/2019 | Park et al. |
| 2019/0393729 A1 | 12/2019 | Contopanagos et al. |
| 2019/0393928 A1 | 12/2019 | Leabman |
| 2020/0006988 A1 | 1/2020 | Leabman |
| 2020/0021128 A1 | 1/2020 | Bell et al. |
| 2020/0052408 A1 | 2/2020 | Rappaport |
| 2020/0091608 A1 | 3/2020 | Alpman et al. |

(56) References Cited

U.S. PATENT DOCUMENTS

| | | | |
|---|---|---|---|
| 2020/0112204 A1 | 4/2020 | Hosseini et al. |
| 2020/0119592 A1 | 4/2020 | Hosseini |
| 2020/0144846 A1 | 5/2020 | Shin |
| 2020/0153117 A1 | 5/2020 | Papio-Toda et al. |
| 2020/0176890 A1 | 6/2020 | Rappaport et al. |
| 2020/0202145 A1 | 6/2020 | Mao et al. |
| 2020/0203837 A1 | 6/2020 | Kornaros et al. |
| 2020/0225673 A1 | 7/2020 | Ebrahimi Afrouzi et al. |
| 2020/0235614 A1 | 7/2020 | Swan et al. |
| 2020/0244104 A1 | 7/2020 | Katajamaki et al. |
| 2020/0244111 A1 | 7/2020 | Johnston et al. |
| 2020/0252141 A1 | 8/2020 | Sarajedini |
| 2020/0274397 A1 | 8/2020 | Hwang et al. |
| 2021/0091606 A1 | 3/2021 | Johnston et al. |
| 2021/0098882 A1 | 4/2021 | Paulotto et al. |
| 2021/0226481 A1 | 7/2021 | Chan et al. |
| 2021/0296936 A1 | 9/2021 | Hosseini |
| 2022/0271572 A1 | 8/2022 | Johnston et al. |
| 2023/0057092 A1 | 2/2023 | Hoss |
| 2023/0378817 A1 | 11/2023 | Johnston et al. |
| 2023/0420996 A1 | 12/2023 | Johnston et al. |

FOREIGN PATENT DOCUMENTS

| | | | |
|---|---|---|---|
| CN | 102089952 A | 6/2011 |
| CN | 102227884 A | 10/2011 |
| CN | 102292896 A | 12/2011 |
| CN | 102860037 A | 1/2013 |
| CN | 103094993 A | 5/2013 |
| CN | 103151848 A | 6/2013 |
| CN | 103348563 A | 10/2013 |
| CN | 203826555 U | 9/2014 |
| CN | 104090265 A | 10/2014 |
| CN | 104167773 A | 11/2014 |
| CN | 104347915 A | 2/2015 |
| CN | 104617680 A | 5/2015 |
| CN | 105207373 A | 12/2015 |
| CN | 105637727 A | 6/2016 |
| CN | 105765821 A | 7/2016 |
| CN | 105993105 A | 10/2016 |
| CN | 106329116 A | 1/2017 |
| CN | 106464027 A | 2/2017 |
| CN | 103380561 B | 9/2017 |
| DE | 20016655 U1 | 2/2002 |
| DE | 102013216953 A1 | 2/2015 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| GB | 2556620 A | 6/2018 |
| JP | 2000323916 A | 11/2000 |
| JP | 2002319816 A | 10/2002 |
| JP | 2006157586 A | 6/2006 |
| JP | 2006178910 A | 7/2006 |
| JP | 2007043432 A | 2/2007 |
| JP | 2008167017 A | 7/2008 |
| JP | 2009525715 A | 7/2009 |
| JP | 2009201328 A | 9/2009 |
| JP | 2010104098 A | 5/2010 |
| JP | 2012016171 A | 1/2012 |
| JP | 2012095226 A | 5/2012 |
| JP | 2012157167 A | 8/2012 |
| JP | 2012170194 A | 9/2012 |
| JP | 2013500693 A | 1/2013 |
| JP | 2013027074 A | 2/2013 |
| JP | 2013511908 A | 4/2013 |
| JP | 2013099249 A | 5/2013 |
| JP | 2013162624 A | 8/2013 |
| JP | 2013243908 A | 12/2013 |
| JP | 2014075927 A | 4/2014 |
| JP | 2014112063 A | 6/2014 |
| JP | 2014176131 A | 9/2014 |
| JP | 2015027345 A | 2/2015 |
| JP | 2015128349 A | 7/2015 |
| JP | 2015128370 A | 7/2015 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140025410 A | 3/2014 |
| KR | 20140085200 A | 7/2014 |
| KR | 20140148270 A | 12/2014 |
| KR | 20150077678 A | 7/2015 |
| KR | 20160018826 A | 2/2016 |
| KR | 20190009237 A | 1/2019 |
| RU | 2658332 C1 | 6/2018 |
| WO | WO 199508125 A1 | 3/1995 |
| WO | WO 199831070 A1 | 7/1998 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2013175596 A1 | 11/2013 |
| WO | WO 2014068992 A1 | 5/2014 |
| WO | WO 2014075103 A1 | 5/2014 |
| WO | WO 2014113093 A1 | 7/2014 |
| WO | WO 2014132258 A1 | 9/2014 |
| WO | WO 2014134996 A1 | 9/2014 |
| WO | WO 2014171348 A1 | 10/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016024869 A1 | 2/2016 |
| WO | WO 2016048512 A1 | 3/2016 |
| WO | WO 2016088261 A1 | 6/2016 |
| WO | WO 2016187357 A1 | 11/2016 |
| WO | WO2015177859 A1 | 4/2017 |
| WO | WO2017056260 A1 | 10/2017 |
| WO | WO 2018203176 A1 | 11/2018 |
| WO | WO 2019012372 A1 | 1/2019 |

OTHER PUBLICATIONS

Energous Corp., IPRP, PCT/US2014/040705, Dec. 8, 2015, 6 pgs.
Energous Corp., IPRP, PCT/US2014/045119, Jan. 12, 2016, 9 pgs.
Energous Corp., IPRP, PCT/US2014/048002, Feb. 12, 2015, 8 pgs.
Energous Corp., IPRP, PCT/US2014/049669, Feb. 9, 2016, 8 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/068282, Jun. 7, 2016, 10 pgs.

(56) References Cited

OTHER PUBLICATIONS

Energous Corp., IPRP, PCT/US2014/068568, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068498, Jun. 28, 2018, 6 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/051082, Mar. 17, 2020, 9 pgs.
Energous Corp., IPRP, PCT/US2018/058178, May 5, 2020, 7 pgs.
Energous Corp., IPRP, PCT/US2018/064289, Dec. 29, 2020, 8 pgs.
Energous Corp., IPRP, PCT/US2019/015820, Aug. 4, 2020, 7 pgs.
Energous Corp., IPRP, PCT/US2019/021817, Sep. 15, 2020, 7 pgs.
Energous Corp., IPRP, PCT/US2020/051692, Mar. 15, 2022, 6 pgs.
Energous Corp., IPRP, PCT/US2020/051694, Mar. 15, 2022, 7 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.

(56) References Cited

OTHER PUBLICATIONS

Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Energous Corp., ISRWO, PCT/US2020/027409, Jul. 24, 2020, 11 pgs.
Energous Corp., ISRWO, PCT/US2020/051692, Jan. 6, 2021, 9 pgs.
Energous Corp., ISRWO, PCT/US2020/051694, Jan. 6, 2021, 11 pgs.
Energous Corp., ISRWO, PCT/US2020/067566, Apr. 27, 2021, 12 pgs.
Extended European Search Report, EP17882087.4, Sep. 17, 2019, 10 pgs.
Notice of Intent to Issue Reexam Certificate: U.S. Appl. No. 90/013,793 Feb. 2, 2017, 8 pgs.
Order Granting Reexamination Request, U.S. Appl. No. 90/013,793 Aug. 31, 2016, 23 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, PGR2016-00023-Institution Decision, Nov. 29, 2016, 29 pgs.
*Ossia Inc.* vs *Energous Corp.*, PGR2016-00024-Institution Decision, Nov. 29, 2016, 50 pgs.
*Ossia Inc.* vs *Energous Corp.*, PGR2016-00024-Judgement-Adverse, Jan. 20, 2017, 3 pgs.
Extended European Search Report, EP20866267.6, Nov. 6, 2023, 14 pgs.
Adamiuk et al., "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
César Sánchez-Pérez et al., "Design and Applications of a 300-800 MHZ Tunable Matching Network", IEEE Journal on Emerging and Selected Topics in Circuits and Systems, vol. 3, No. 4, Dec. 2013, 10 pgs.
Gill et al., "A System for Change Detection and Human Recognition in Voxel Space using the Microsoft Kinect Sensor," 2011 IEEE Applied Imagery Pattern Recognition Workshop, 8 pgs.
Han et al., Enhanced Computer Vision with Microsoft Kinect Sensor: A Review, IEEE Transactions on Cybernetics vol. 43, No. 5., pp. 1318-1334, Oct. 3, 2013.
Hsieh et al., "Development of a Retrodirective Wireless Microwave Power Transmission System", IEEE, 2003, pp. 393-396.
Leabman, "Adaptive Band-partitioning for Interference Cancellation in Communication System," Thesis Massachusetts Institute of Technology, Feb. 1997, pp. 1-70.
Li et al., "High-Efficiency Switching-Mode Charger System Design Considerations with Dynamic Power Path Management," Mar./Apr. 2012 Issue, 8 pgs.
Mao et al., "BeamStar: An Edge-Based Approach to Routing in Wireless Sensors Networks", IEEE Transactions on Mobile Computing, IEEE Service Center, Los Alamitos, CA, vol. 6, No. 11, Nov. 1, 2007, 13 pgs.
Mascarenas et al., "Experimental Studies of Using Wireless Energy Transmission for Powering Embedded Sensor Nodes," Nov. 28, 2009, Journal of Sound and Vibration, 13 pgs.
Mishra et al., "SIW-based Slot Array Antenna and Power Management Circuit for Wireless Energy Harvesting Applications", IEEE APSURSI, Jul. 2012, 2 pgs.
Nenzi et al., "U-Helix: On-Chip Short Conical Antenna", 7th European Conference on Antennas and Propagation (EUCAP), ISBN: 978-1-4673-2187-7, IEEE, Apr. 8, 2013, 5 pgs.
Qing et al., "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.
Singh, "Wireless Power Transfer Using Metamaterial Bonded Microstrip Antenna for Smart Grid WSN", 4th International Conference on Advances in Computing and Communications (ICACC), Aug. 27-29, 2014, 1 pg.
Smolders, "Broadband Microstrip Array Antennas", Institute of Electrical and Electronics Engineers, Digest of the Antennas and Propagation Society International Symposium, Seattle, WA, Jun. 19-24, 1994, 3 pgs.
Van Veen et al., "Beamforming: A Versatile Approach to Spatial Filtering", IEEE, ASSP Magazine, Apr. 1988, pp. 4-24.
Wei et al., "Design of a Wideband Horizontally Polarized Omnidirectional Printed Loop Antenna," IEEE Antennas and Wireless Propagation Letters, vol. 11, Jan. 3, 2012, 4 pgs.
Zeng et al., "A Compact Fractal Loop Rectenna for RF Energy Harvesting," IEEE Antennas and Wireless Propagation Letters, vol. 16, Jun. 26, 2017, 4 pgs.
Zhai et al., "A Practical Wireless Charging System Based on Ultra-Wideband Retro-Reflective Beamforming", 2010 IEEE Antennas and Propagation Society International Symposium, Toronto, ON, 2010, 4 pgs.

Receiver 104

SYSTEMS AND METHODS FOR MACHINE LEARNING ZONE-BASED FOREIGN OBJECT DETECTION FOR WIRELESS POWER TRANSMISSION

RELATED APPLICATIONS

This application is a continuation of U.S. patent application Ser. No. 17/831,037, filed on Jun. 2, 2022, entitled "Systems And Methods For Machine Learning Based Foreign Object Detection For Wireless Power Transmission," which is a continuation of U.S. patent application Ser. No. 17/026,196, filed on Sep. 19, 2020 (now U.S. Pat. No. 11,381,118), entitled "Systems And Methods For Machine Learning Based Foreign Object Detection For Wireless Power Transmission," which claims priority to U.S. Provisional Application Ser. No. 62/903,674, filed Sep. 20, 2019, entitled "Systems And Methods For Machine Learning Based Foreign Object Detection For Wireless Power Transmission," each of which is incorporated by reference herein in its entirety.

This application is related to U.S. patent application Ser. No. 17/026,191, which claims priority from Provisional Application Ser. No. 62/903,677, filed Sep. 20, 2019, entitled "Classifying And Detecting Foreign Objects Using A Power Amplifier Controller Integrated Circuit In Wireless Power Transmission Systems," each of which is incorporated by reference herein in its entirety.

This application is related to U.S. patent application Ser. No. 16/045,637, entitled "Systems and Methods for Detecting Wireless Power Receivers and Other Objects at a Near-Field Charging Pad," filed Jul. 25, 2018, which is incorporated herein in its entirety.

This application is related to PCT Patent Application No. PCT/US17/65886, filed Dec. 12, 2017, which is a continuation of U.S. Non-Provisional patent application Ser. No. 15/833,790, filed Dec. 6, 2017, which is a continuation-in-part of U.S. Non-Provisional patent application Ser. No. 15/424,552, filed Feb. 3, 2017, which claims priority to U.S. Provisional Application Ser. No. 62/433,227, filed Dec. 12, 2016. PCT Patent Application No. PCT/US17/65886 also claims priority to U.S. Provisional Application Ser. No. 62/541,581, filed Aug. 4, 2017. Each of these applications is hereby incorporated by reference in its respective entirety.

TECHNICAL FIELD

The embodiments herein generally relate to antennas, software, and devices used in wireless power transmission systems and, more specifically, to systems and methods for machine-learning based foreign object detection for wireless power transmission.

BACKGROUND

Building a wireless charging system for consumer devices typically requires complicated, and often, expensive antenna components to transmit and receive wirelessly delivered power. Conventionally, it is hard for a wireless power transmitter to accurately distinguish a valid wireless power receiver that needs to be charged, versus a foreign object that does not need to be charged. Users have encountered numerous frustrating issues with some conventional charging devices, including having damages caused to objects that include magnetic strips and/or RFID chips (e.g., credits cards, security badges, passports, key fobs, and the like). Moreover, many of these conventional charging devices typically require placing the device to be charged at a specific position around the wireless power transmitter, and the device may not be moved to different positions, without interrupting or terminating the charging of the device. This results in a frustrating experience for many users as they may be unable to locate the device at the exact right position within the charging field of the wireless power transmitter in which to start charging their device, and may further end up with damages to important objects that they use on a daily basis.

SUMMARY

Accordingly, there is a need for wireless charging systems (e.g., radio frequency (RF) charging pads) that address the problems identified above. To this end, systems and methods are described herein that are capable of detecting and/or classifying objects for wireless power transmission. Such systems and methods of use thereof discover presence of objects in order to determine whether to proceed with delivery of wireless power or whether to forgo transmitting wireless power in order to avoid potentially damaging any of the detected objects. Such systems identify wireless power receivers and/or ignore one or more wireless power receivers that are not to be charged or powered and, thereby, avoid power leeching and other drains on the system as a whole, while ensuring that authorized wireless power receivers always receive power.

The systems disclosed herein use machine learning models to detect the presence of and/or to classify objects (including objects that are not wireless power receivers) that are present on or near the system. The machine learning models are trained apriori using a known set of objects and/or a predetermined set of features. During the training phase, the system transmits test power transmission signals and then receives reflected power back from one or more wireless power receivers or from one or more objects. The reflected power is collected and analyzed to identify signature signals (selected features) to train the machine learning models. The machine learning models are subsequently used by the wireless power transmission system to determine whether an authorized device is present and/or to determine whether an object other than a wireless power receiver is present.

In some embodiments, the process for reflecting power works even if an authorized wireless power receiver has no power remaining (e.g., its battery is completely drained), as the wireless power receiver is able to harness energy from the test power transmission signals to create impedance changes at the receiver side, which then cause different amounts of reflected power to be detected at the RF charging system (and within different power-transfer zones thereof), thereby allowing the receiver to convey data to the RF charging system. Such systems and methods could further manage power transfer control communication between the RF charging system and wireless power receivers without any data-communication capability and without using any sophisticated sensors.

In the description that follows, references are made to an RF charging system that includes various antenna zones. For the purposes of this description, power-transfer (or antenna) zones include one or more power-transferring elements (e.g., antennas such as a capacitive coupler) of the RF charging system, and each power-transfer zone may be individually addressable by a controlling integrated circuit (e.g., RF power transmitter integrated circuit 160, FIGS. 1A-1B) to allow for selective activation of each power-transfer zone in order to determine which power-transfer zone is able to most efficiently transfer wireless power to a receiver. The system described herein can be used for near-field wireless charging (e.g., charging pads). For purposes of this disclosure, near-field wireless charging is the transmission of power over a distance of between 0 to 6 inches away from a wireless power transmitter. The techniques described herein may also be used for transmission of wireless power over longer distances.

(A1) In some embodiments, a method of detecting and classifying foreign objects is performed at a computer system. The computer system has one or more processors and memory storing one or more programs configured for execution by the one or more processors. The method includes obtaining a plurality of electrical measurements while a wireless-power-transmitting antenna is transmitting different power beacons. The method also includes forming a feature vector according to the plurality of electrical measurements. The method further includes detecting a presence of one or more foreign objects prior to transmitting wireless power to one or more wireless power receivers by inputting the feature vector to trained one or more classifiers. Each classifier is a machine-learning model trained to detect foreign objects distinct from the one or more wireless power receivers.

(A2) In some embodiments of the method of A1, each classifier is further trained to classify foreign objects, and the method further includes classifying the one or more foreign objects into one or more categories.

(A3) In some embodiments of the method of any one of A1-A2, at least one respective power beacon of the different power beacons. Each zone corresponds to a distinct charging area. In some embodiments, each zone has an associated transmitting antenna, and all of the zones form a wireless-power-transmission system. Each of the transmitting antennas is responsible for sending power to a respective distinct charging area. The method includes obtaining a respective set of electrical measurements for each zone of the plurality of zones. The method also includes forming the feature vector comprises calculating a respective feature data for each set of electrical measurements, and aggregating each feature data to obtain the feature vector.

(A4) In some embodiments of the method of any one of A1-A3, the method further includes, prior to inputting the feature vector to the trained one or more classifiers, transforming the feature vector to compensate for a predetermined set of conditions including environmental differences between when training the one or more classifiers to detect foreign objects and when operating the one or more classifiers to detect foreign objects (e.g., temperature, or board-to-board variation).

(A5) In some embodiments of the method of any one of A1-A4, the method further includes, applying, at a first classifier of the one or more classifiers that has a first machine-learning model, reinforcement learning to adjust (or recalibrate) one or more weights used in the first machine-learning model upon determining that (i) the first classifier has detected a presence of the one or more foreign objects and (ii) wireless power received by the one or more wireless power receivers indicates that no foreign object is present.

(A6) In some embodiments of the method of any one of A1-A5, the trained one or more classifiers detect that the one or more foreign objects are present. The method further includes continuing to (i) obtain the plurality of electrical measurements, (ii) form the feature vector, and (iii) detect that the one or more foreign objects are present by inputting the feature vector to the trained one or more classifiers. The method further includes waiting to transmit wireless power to the one or more wireless power receivers until the one or more classifiers stop detecting that the one or more foreign objects are present.

(A7) In some embodiments of the method of A6, each of the different power beacons is transmitted in an iterative fashion at each of a plurality of zones. Each zone corresponds to a distinct charging area of the wireless power transmitting antenna. The method includes obtaining a first set of electrical measurements for a first zone of the plurality of zones. The method also includes waiting to transmit wireless power to the one or more wireless power receivers until the one or more classifiers stop detecting that the one or more foreign objects are present in the first zone.

(A8) In some embodiments of the method of A6, the plurality of electrical measurements are obtained at predetermined time intervals.

(A9) In some embodiments of the method of any one of A1-A8, the plurality of electrical measurements include measurements of one or more of: load impedance, reflective power, forward power, drive current, drive voltage, magnetics, and temperature.

(A10) In some embodiments of the method of any one of A1-A9, each classifier is trained to detect one or more of: coins, credit cards, and RFID tags.

(A11) In some embodiments of the method of any one of A1-A10, the one or more classifiers are further trained to detect a presence of a first wireless power receiver. The method further includes transmitting wireless power to the first wireless power receiver. The method also includes, while transmitting the wireless power to the first wireless power receiver, continuing to (i) obtain the plurality of electrical measurements, (ii) form the feature vector, and (iii) detect that the first wireless power receiver is present by inputting the feature vector to the trained one or more classifiers. The method also includes ceasing to transmit wireless power from the wireless power transmitting antenna to the first wireless power receiver when the one or more classifiers stop detecting the presence of the first wireless power receiver.

(A12) In some embodiments of the method of any one of A1-A11, the one or more classifiers are further trained to detect a charging state of a first wireless power receiver. The method further includes transmitting wireless power to the first wireless power receiver. The method also includes, while transmitting the wireless power to the first wireless power receiver, continuing to (i) obtain the plurality of electrical measurements, (ii) form the feature vector, and (iii) detect the charging state of the first wireless power receiver by inputting the feature vector to the trained one or more classifiers. The method also includes ceasing to transmit wireless power from the wireless power transmitting antenna to the first wireless power receiver when the one or more classifiers detect that the charging state of the first wireless power receiver has reached a predetermined threshold.

(A13) In some embodiments of the method of any one of A1-A12, each power beacon of the different power beacons is transmitted as a low power burst (e.g., an electromagnetic signal that has 50% of a power level used for transmission of wireless power to a receiving device) for a short period of time (e.g., lasts for less than 1 second, as compared to transmitting higher-power signals for minutes at a time while transmitting wireless power to a receiving device).

(A14) In some embodiments of the method of any one of A1-A13, each power beacon of the different power beacons is transmitted using transmission parameters selected from a predetermined set of transmission parameters specifying at least a power level and a frequency.

(A15) In some embodiments of the method of any one of A1-A14, the one or more classifiers include a K-means classifier trained to detect the one or more wireless power receivers and to distinguish the one or more wireless power receivers from the one or more foreign objects.

(A16) In some embodiments of the method of any one of A1-A15, the one or more classifiers include a k-nearest neighbor (k-NN) classifier trained to classify the one or more wireless power receivers and the one or more foreign objects into at least one category of a plurality of categories of objects.

(A17) In some embodiments of the method of any one of A1-A16, the wireless-power-transmitting antenna is one of a plurality of wireless-power transmitting antennas. Each wireless-power-transmitting antenna associated with a respective charging area. Each classifier of the one or more classifiers is trained to detect presence of the one or more foreign objects only in a respective charging area. The method includes detecting the presence of the one or more foreign objects by inputting a respective subset of features of the feature vector corresponding to a respective charging area to a respective classifier of the one or more classifiers that is trained to detect foreign objects in the respective charging area.

(A18) In some embodiments of the method of any one of A1-A17, each classifier of the one or more classifiers is trained to detect a respective class of foreign objects. The method includes detecting the presence of the one or more foreign objects by inputting the feature vector to each classifier to detect the presence of each class of foreign objects. In some embodiments, the one or more classifiers is further trained to detect a presence of foreign objects between the wireless power transmitting antenna and a first wireless power receiver. The method further includes continuing to obtain the plurality of electrical measurements to form the feature vectors to detect the presence of the first foreign objects between the wireless power transmitting antenna and the first wireless power receiver. The method also includes ceasing to transmit wireless power from the wireless power transmitting antenna to the first wireless power receiver until the one or more classifiers stop detecting the presence of the one or more foreign objects.

(A19) In some embodiments of the method of any one of A1-A18, the wireless power transmitting antenna is configured to match the load impedance of the one or more wireless power receivers for optimal power transfer.

(A20) In some embodiments of the method of any one of A1-A19, the wireless-power-transmitting antenna is a near-field transmitting antenna.

(A21) In some embodiments of the method of A20, the near-field transmitting antenna is configured to transmit at a center frequency of between 30-50 MHz.

(A22) In some embodiments of the method of A21, the near-field transmitting antenna is further configured to transmit at a sufficient power level to deliver 20 watts of usable power to the receiver. 20 watts is a high power delivery range beyond current capabilities of inductive-based charging techniques.

(A23) In some embodiments of the method of any one of A1-A22, the one or more classifiers are trained to detect foreign objects according to a set of features that show the most correlation to change in impedance.

In another aspect, an electronic device is provided. The electronic device includes one or more processors, and memory storing one or more programs for execution by the one or more processors. The one or more programs include instructions for performing or causing performance of the method of any one of (A1)-(A23).

In another aspect, a non-transitory computer-readable storage medium stores one or more programs for execution by one or more processors of an electronic device. The one or more programs including instructions for performing or causing performance of the method of any one of (A1)-(A23).

Thus, wireless charging systems configured in accordance with the principles described herein are able to perform one or more operations including (1) alerting a user about improper placement of receiver objects or obstruction of power transmitted to authorized wireless power receivers, (2) detecting presence of any foreign object between the transmission system and the wireless power receivers, and/or (3) managing power transfer between the wireless power transmission system and wireless power receivers, thereby providing numerous improvements and resolving numerous problems and limitations of conventional wireless power transmission systems.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not intended to circumscribe or limit the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1A:
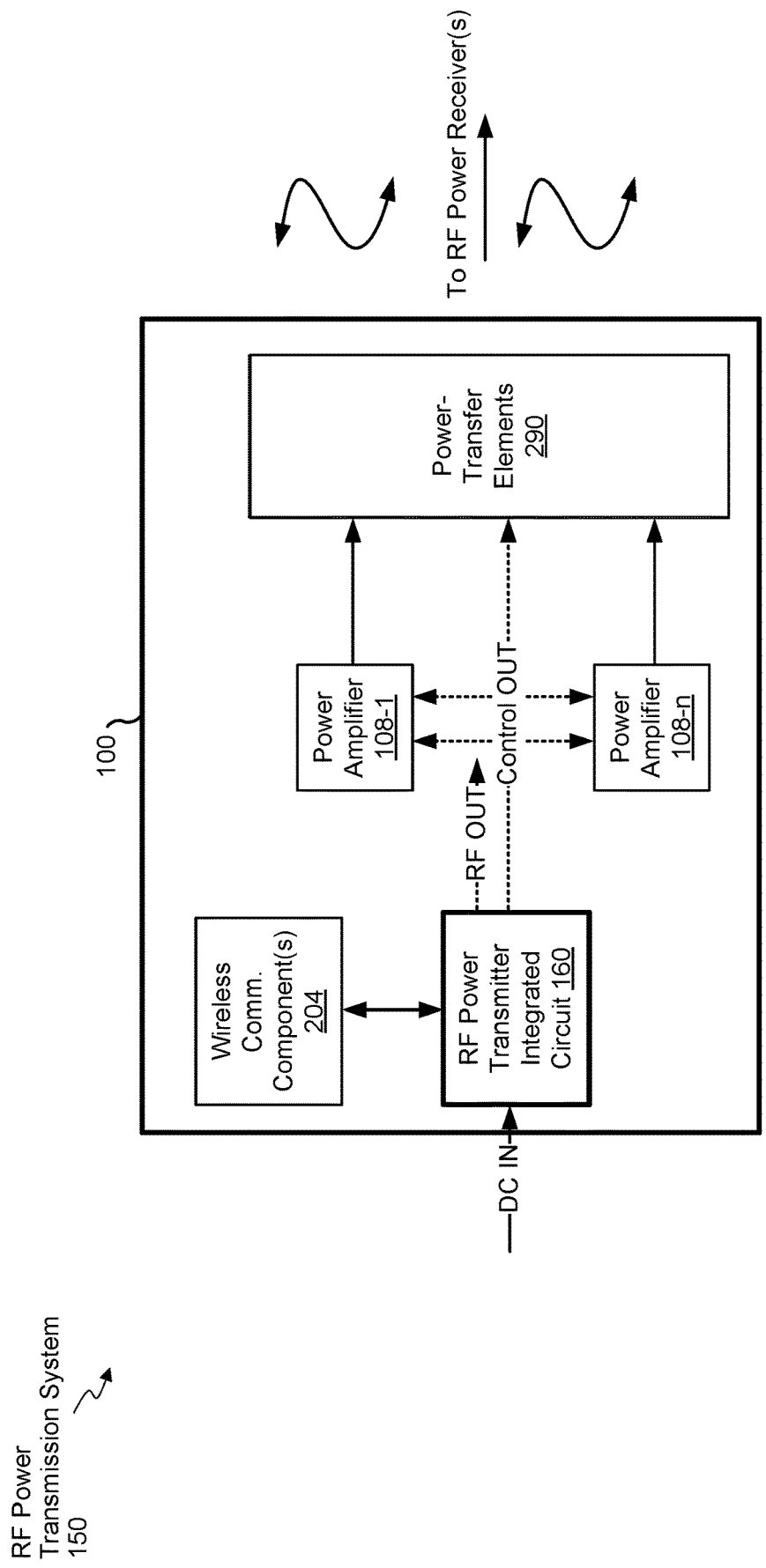
FIG. 1A is a block diagram of an RF wireless power transmission system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1A is a block diagram of an RF wireless power transmission system 150 in accordance with some embodiments. In some embodiments, the RF wireless power transmission system 150 includes a far-field transmitter (not shown). In some embodiments, the RF wireless power transmission system 150 includes a RF charging pad 100 (also referred to herein as a near-field (NF) charging pad 100 or RF charging pad 100). In some embodiments, the RF charging pad 100 includes an RF power transmitter integrated circuit 160 (described in more detail below). In some embodiments, the RF charging pad 100 includes one or more communications components 204 (e.g., wireless communication components, such as WI-FI or BLUETOOTH radios), discussed in more detail below with reference to FIG. 2A. In some embodiments, the RF charging pad 100 also connects to one or more power amplifier units 108-1, . . . 108-n to control operation of the one or more power amplifier units when they drive external power-transfer elements (e.g., power-transfer elements 290). In some embodiments, RF power is controlled and modulated at the RF charging pad 100 via switch circuitry as to enable the RF wireless power transmission system to send RF power to one or more wireless receiving devices via the TX antenna array 210.

In some embodiments, the communication component(s) 204 enable communication between the RF charging pad 100 and one or more communication networks. In some embodiments, the communication component(s) 204 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

In some instances, the communication component(s) 204 are not able to communicate with wireless power receivers for various reasons, e.g., because there is no power available for the communication component(s) to use for the transmission of data signals or because the wireless power receiver itself does not actually include any communication component of its own. As such, it is important to design near-field charging pads that are still able to uniquely identify different types of devices and, when a wireless power receiver is detected, figure out if that wireless power receiver is authorized to receive wireless power.

Figure 1B:
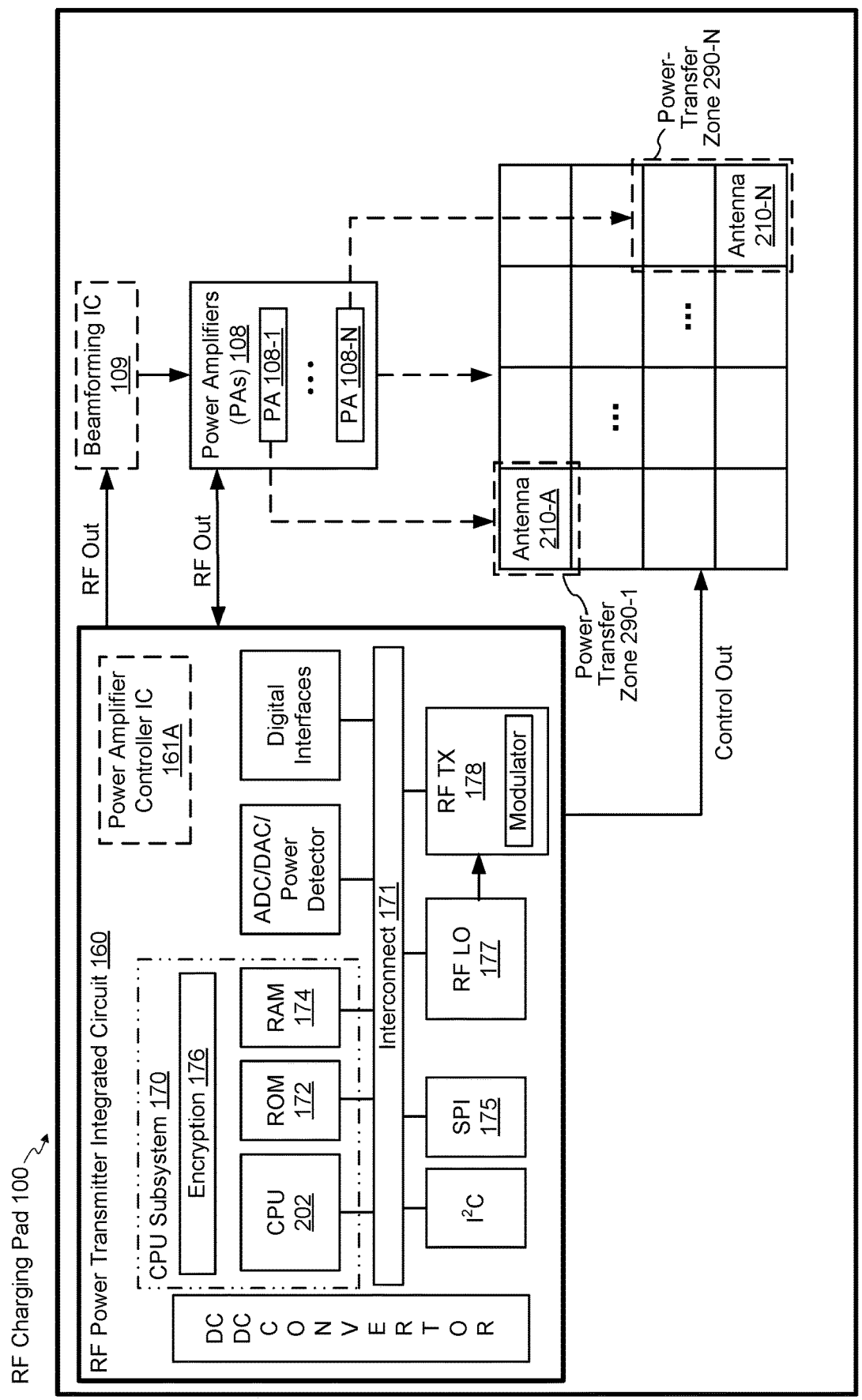
FIG. 1B is a block diagram showing components of an example RF charging pad that includes an RF power transmitter integrated circuit and antenna zones, in accordance with some embodiments.

FIG. 1B is a block diagram of the RF power transmitter integrated circuit 160 (the "integrated circuit") in accordance with some embodiments. In some embodiments, the integrated circuit 160 includes a CPU subsystem 170, an external device control interface, an RF subsection for DC to RF power conversion, and analog and digital control interfaces interconnected via an interconnection component, such as a bus or interconnection fabric block 171. In some embodiments, the CPU subsystem 170 includes a microprocessor unit (CPU) 202 with related Read-Only-Memory (ROM) 172 for device program booting via a digital control interface, e.g. an I²C port, to an external FLASH containing the CPU executable code to be loaded into the CPU Subsystem Random Access Memory (RAM) 174 (e.g., memory 206, FIG. 2A) or executed directly from FLASH. In some embodiments, the CPU subsystem 170 also includes an encryption module or block 176 to authenticate and secure communication exchanges with external devices, such as wireless power receivers that attempt to receive wirelessly delivered power from the RF charging pad 100.

In some embodiments, the RF IC 160 also includes (or is in communication with) a power amplifier controller IC 161A (PA IC) that is responsible for controlling and managing operations of a power amplifier, including for reading measurements of impedance at various measurement points within the power amplifier, which measurements are used in some instances to allow for detection of foreign objects. The PA IC may be on the same integrated circuit at the RF IC 160, or may be on its on integrated circuit that is separate from (but still in communication with) the RF IC 160. Additional details regarding the architecture and operation of the PA IC are provided in U.S. Provisional Application No. 62/903,677, which disclosure is incorporated by reference in its entirety.

In some embodiments, executable instructions running on the CPU (such as those shown in the memory 206 in FIG. 2A and described below) are used to manage operation of the RF charging pad 100 and to control external devices through a control interface, e.g., SPI control interface 175, and the other analog and digital interfaces included in the RF power transmitter integrated circuit 160. In some embodiments, the CPU subsystem also manages operation of the RF subsection of the RF power transmitter integrated circuit 160, which includes an RF local oscillator (LO) 177 and an RF transmitter (TX) 178. In some embodiments, the RF LO 177 is adjusted based on instructions from the CPU subsystem 170 and is thereby set to different desired frequencies of operation, while the RF TX converts, amplifies, modulates the RF output as desired to generate a viable RF power level.

In the descriptions that follow, various references are made to antenna zones and power-transfer zones, which terms are used synonymously in this disclosure. In some embodiments the antenna/power-transfer zones may include antenna elements that transmit propagating radio frequency waves but, in other embodiments, the antenna/power transfer zones may instead include capacitive charging couplers that convey electrical signals but do not send propagating radio frequency waves.

In some embodiments, the RF power transmitter integrated circuit 160 provides the viable RF power level (e.g., via the RF TX 178) to an optional beamforming integrated circuit (IC) 109, which then provides phase-shifted signals to one or more power amplifiers 108. In some embodiments, the beamforming IC 109 is used to ensure that power transmission signals sent using two or more antennas 210 (e.g., each antenna 210 may be associated with a different antenna zone 290 or may each belong to a single antenna zone 290) to a particular wireless power receiver are transmitted with appropriate characteristics (e.g., phases) to ensure that power transmitted to the particular wireless power receiver is maximized (e.g., the power transmission signals arrive in phase at the particular wireless power receiver). In some embodiments, the beamforming IC 109 forms part of the RF power transmitter IC 160. In embodiments in which capacitive couplers (e.g., capacitive charging couplers 244) are used as the antennas 210, then optional beamforming IC 109 may not be included in the RF power transmitter integrated circuit 160.

In some embodiments, the RF power transmitter integrated circuit 160 provides the viable RF power level (e.g., via the RF TX 178) directly to the one or more power amplifiers 108 and does not use the beamforming IC 109 (or bypasses the beamforming IC if phase-shifting is not required, such as when only a single antenna 210 is used to transmit power transmission signals to a wireless power receiver). In some embodiments, the PA IC 161A receives the viable RF power level and provides that to the PAs 108.

In some embodiments, the one or more power amplifiers 108 then provide RF signals to the antenna zones 290 (also referred to herein as "power-transfer zones") for transmission to wireless power receivers that are authorized to receive wirelessly delivered power from the RF charging pad 100. In some embodiments, each antenna zone 290 is coupled with a respective PA 108 (e.g., antenna zone 290-1 is coupled with PA 108-1 and antenna zone 290-N is coupled with PA 108-N). In some embodiments, multiple antenna zones are each coupled with a same set of PAs 108 (e.g., all PAs 108 are coupled with each antenna zone 290). Various arrangements and couplings of PAs 108 to antenna zones 290 allow the RF charging pad 100 to sequentially or selectively activate different antenna zones in order to determine the most efficient antenna zone 290 to use for transmitting wireless power to a wireless power receiver. In some embodiments, the one or more power amplifiers 108 are also in communication with the CPU subsystem 170 to allow the CPU 202 to measure output power provided by the PAs 108 to the antenna zones of the RF charging pad 100. In some embodiments, the PAs 108 may include various measurement points that allow for at least measuring impedance values that are used to enable the foreign object detection techniques described herein (additional details and examples regarding such measurement points are provided in the incorporated-by-reference U.S. Provisional Application No. 62/903,677.

FIG. 1B also shows that, in some embodiments, the antenna zones 290 of the RF charging pad 100 may include one or more antennas 210A-N. In some embodiments, each antenna zones of the plurality of antenna zones includes one or more antennas 210 (e.g., antenna zone 290-1 includes one antenna 210-A and antenna zones 290-N includes multiple antennas 210). In some embodiments, a number of antennas included in each of the antenna zones is dynamically defined based on various parameters, such as a location of a wireless power receiver on the RF charging pad 100. In some embodiments, the antenna zones may include one or more of the meandering line antennas described in more detail below. In some embodiments, each antenna zone 290 may include antennas of different types (e.g., a meandering line antenna and a loop antenna), while in other embodiments each antenna zone 290 may include a single antenna of a same type (e.g., all antenna zones 290 include one meandering line antenna), while in still other embodiments, the antennas zones may include some antenna zones that include a single antenna of a same type and some antenna zones that include antennas of different types. In some embodiments the antenna/power-transfer zones may also or alternatively include capacitive charging couplers that convey electrical signals but do not send propagating radio frequency waves. Antenna zones are also described in further detail below.

In some embodiments, the RF charging pad 100 may also include a temperature monitoring circuit that is in communication with the CPU subsystem 170 to ensure that the RF charging pad 100 remains within an acceptable temperature range. For example, if a determination is made that the RF charging pad 100 has reached a threshold temperature, then operation of the RF charging pad 100 may be temporarily suspended until the RF charging pad 100 falls below the threshold temperature.

By including the components shown for RF power transmitter circuit 160 (FIG. 1B) on a single chip, such transmitter chips are able to manage operations at the transmitter chips more efficiently and quickly (and with lower latency), thereby helping to improve user satisfaction with the charging pads that are managed by these transmitter chips. For example, the RF power transmitter circuit 160 is cheaper to construct, has a smaller physical footprint, and is simpler to install. Furthermore, and as explained in more detail below in reference to FIG. 2A, the RF power transmitter circuit 160 may also include a secure element module 234 (e.g., included in the encryption block 176 shown in FIG. 1B) that is used in conjunction with a secure element module 282 (FIG. 2B) or a receiver 104 to ensure that only authorized receivers are able to receive wirelessly delivered power from the RF charging pad 100 (FIG. 1B).

Figure 1C:
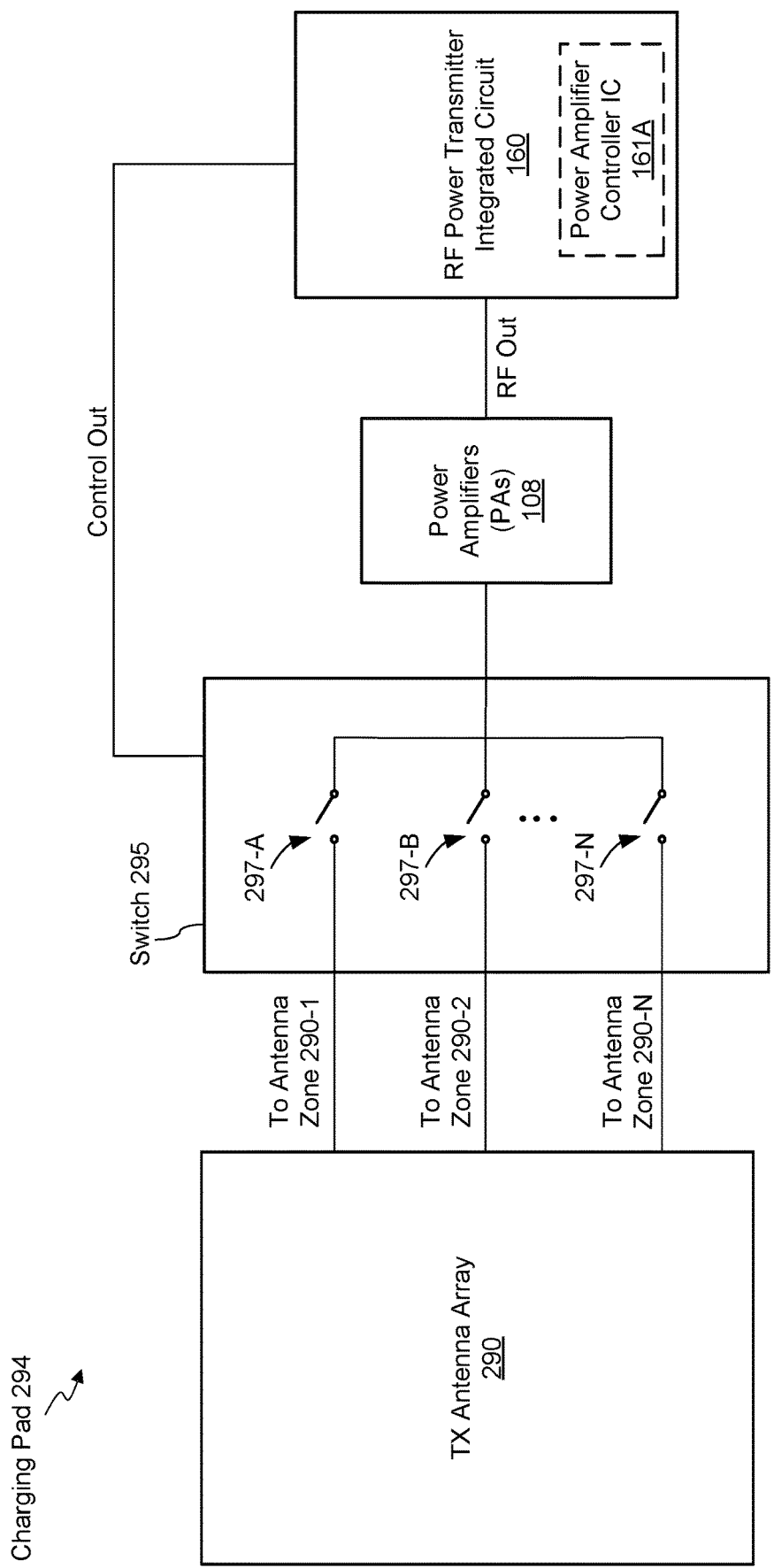
FIG. 1C is a block diagram showing components of an example RF charging pad that includes an RF power transmitter integrated circuit coupled to a switch, in accordance with some embodiments.

FIG. 1C is a block diagram of a charging pad 294 in accordance with some embodiments. The charging pad 294 is an example of the charging pad 100 (FIG. 1A), however, one or more components included in the charging pad 100 are not included in the charging pad 294 for ease of discussion and illustration.

The charging pad 294 includes an RF power transmitter integrated circuit 160, one or more power amplifiers 108, a PA IC 161A (which may be on the same or a separate IC from the RF power transmitter IC 160), and a transmitter antenna array 290 having multiple antenna zones. Each of these components is described in detail above with reference to FIGS. 1A and 1B. Additionally, the charging pad 294 includes a switch 295 (i.e., transmitter-side switch), positioned between the power amplifiers 108 and the antenna array 290, having a plurality of switches 297-A, 297-B, ... 297-N. The switch 295 is configured to switchably connect one or more power amplifiers 108 with one or more antenna zones of the antenna array 290 in response to control signals provided by the RF power transmitter integrated circuit 160.

To accomplish the above, each switch 297 is coupled with (e.g., provides a signal pathway to) a different antenna zone of the antenna array 290. For example, switch 297-A may be coupled with a first antenna zone 290-1 (FIG. 1B) of the antenna array 290, switch 297-B may be coupled with a second antenna zone 290-2 of the antenna array 290, and so on. Each of the plurality of switches 297-A, 297-B, ... 297-N, once closed, creates a unique pathway between a respective power amplifier 108 (or multiple power amplifiers 108) and a respective antenna zone of the antenna array 290. Each unique pathway through the switch 295 is used to selectively provide RF signals to specific antenna zones of the antenna array 290. It is noted that two or more of the plurality of switches 297-A, 297-B, ... 297-N may be closed at the same time, thereby creating multiple unique pathways to the antenna array 290 that may be used simultaneously.

In some embodiments, the RF power transmitter integrated circuit 160 (or the PA IC 161A, or both) is (are) coupled to the switch 295 and is configured to control operation of the plurality of switches 297-A, 297-B, ... 297-N (illustrated as a "control out" signal in FIGS. 1A and 1C). For example, the RF power transmitter integrated circuit 160 may close a first switch 297-A while keeping the other switches open. In another example, the RF power transmitter integrated circuit 160 may close a first switch 297-A and a second switch 297-B, and keep the other switches open (various other combinations and configuration are possible). Moreover, the RF power transmitter integrated circuit 160 is coupled to the one or more power amplifiers 108 and is configured to generate a suitable RF signal (e.g., the "RF Out" signal) and provide the RF signal to the one or more power amplifiers 108. The one or more power amplifiers 108, in turn, are configured to provide the RF signal to one or more antenna zones of the antenna array 290 via the switch 295, depending on which switches 297 in the switch 295 are closed by the RF power transmitter integrated circuit 160.

To further illustrate, as described in some embodiments below, the charging pad is configured to transmit test power transmission signals and/or regular power transmission signals using different antenna zones, e.g., depending on a location of a receiver on the charging pad. Accordingly, when a particular antenna zone is selected for transmitting test signals or regular power signals, a control signal is sent to the switch 295 from the RF power transmitter integrated circuit 160 to cause at least one switch 297 to close. In doing so, an RF signal from at least one power amplifier 108 can be provided to the particular antenna zone using a unique pathway created by the now-closed at least one switch 297.

In some embodiments, the switch 295 may be part of (e.g., internal to) the antenna array 290. Alternatively, in some embodiments, the switch 295 is separate from the antenna array 290 (e.g., the switch 295 may be a distinct component, or may be part of another component, such as the power amplifier(s) 108). It is noted that any switch design capable of accomplishing the above may be used, and the design of the switch 295 illustrated in FIG. 1C is merely one example.

Figure 2A:
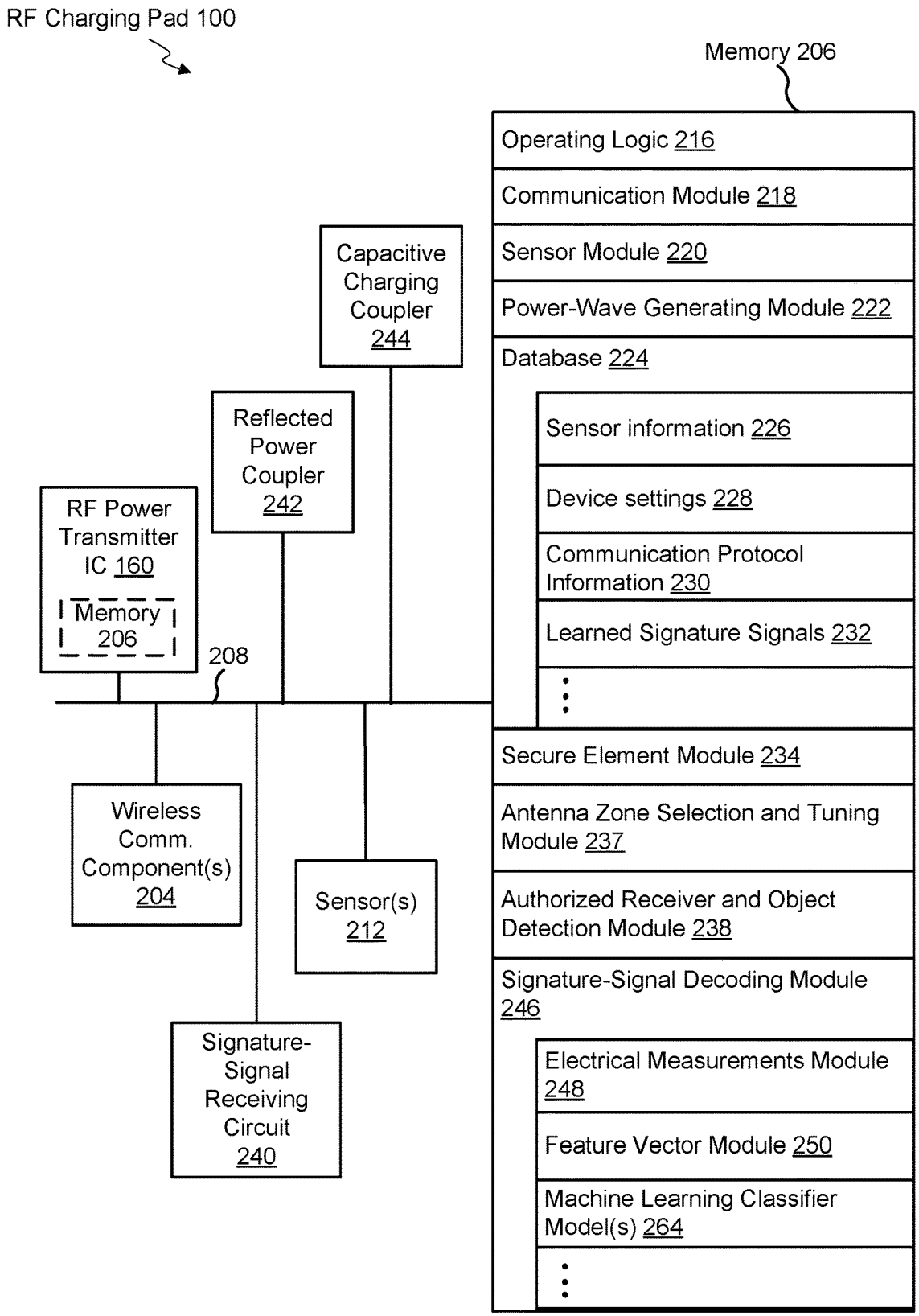
FIG. 2A is a block diagram illustrating an example RF charging pad, in accordance with some embodiments.

FIG. 2A is a block diagram illustrating certain components of an RF charging pad 100 in accordance with some embodiments. In some embodiments, the RF charging pad 100 includes an RF power transmitter IC 160 (and the components included therein, such as those described above in reference to FIGS. 1A-1B), memory 206 (which may be included as part of the RF power transmitter IC 160, such as nonvolatile memory 206 that is part of the CPU subsystem 170), and one or more communication buses 208 for interconnecting these components (sometimes called a chipset). In some embodiments, the RF charging pad 100 includes one or more sensor(s) 212 (discussed below). In some embodiments, the RF charging pad 100 includes one or more output devices such as one or more indicator lights, a sound card, a speaker, a small display for displaying textual information and error codes, etc. In some embodiments, the RF charging pad 100 includes a location detection device, such as a GPS (global positioning satellite) or other geo-location receiver, for determining the location of the RF charging pad 100.

In some embodiments, the one or more sensor(s) 212 include one or more thermal radiation sensors, ambient temperature sensors, humidity sensors, IR sensors, occupancy sensors (e.g., RFID sensors), ambient light sensors, motion detectors, accelerometers, and/or gyroscopes.

In some embodiments, the RF charging pad 100 further includes a signature-signal receiving circuit 240, a reflected power coupler 242, and a capacitive charging coupler 244.

The memory 206 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, or alternatively the non-volatile memory within memory 206, includes a non-transitory computer-readable storage medium. In some embodiments, the memory 206, or the non-transitory computer-readable storage medium of the memory 206, stores the following programs, modules, and data structures, or a subset or superset thereof:

Operating logic 216 including procedures for handling various basic system services and for performing hardware dependent tasks;

Communication module 218 for coupling to and/or communicating with remote devices (e.g., remote sensors, transmitters, receivers, servers, mapping memories, etc.) in conjunction with wireless communication component(s) 204;

Sensor module 220 for obtaining and processing sensor data (e.g., in conjunction with sensor(s) 212) to, for example, determine the presence, velocity, and/or positioning of object in the vicinity of the RF charging pad 100;

Power-wave generating module 222 for generating and transmitting power transmission signals (e.g., in conjunction with antenna zones 290 and the antennas 210 respectively included therein), including but not limited to, forming pocket(s) of energy at given locations. Power-wave generating module 222 may also be used to modify values of transmission characteristics (e.g., power level (i.e., amplitude), phase, frequency, etc.) used to transmit power transmission signals by individual antenna zones;

Database 224, including but not limited to:
  Sensor information 226 for storing and managing data received, detected, and/or transmitted by one or more sensors (e.g., sensors 212 and/or one or more remote sensors);
  Device settings 228 for storing operational settings for the RF charging pad 100 and/or one or more remote devices;
  Communication protocol information 230 for storing and managing protocol information for one or more protocols (e.g., custom or standard wireless protocols, such as ZigBee, Z-Wave, etc., and/or custom or standard wired protocols, such as Ethernet); and
  Learned signature signals 232 for a variety of different wireless power receivers and other objects (which are not wireless power receivers).

a secure element module 234 for determining whether a wireless power receiver is authorized to receive wirelessly delivered power from the RF charging pad 100;

an antenna zone selecting and tuning module 237 for coordinating a process of transmitting test power transmission signals with various antenna zones to determine which antenna zone or zones should be used to wirelessly deliver power to various wireless power receivers (as is explained in more detail below in reference to FIGS. 9A-9B of incorporated-by-reference PCT Patent Application No. PCT/US17/65886);

an authorized receiver and object detection module 238 used for detecting various signature signals from wireless power receivers and from other objects, and then determining appropriate actions based on the detecting of the various signature signals (as is described in more detail below in reference to FIGS. 9A-9B); and a signature-signal decoding module 246 used to decode the detected signature signals and determine message or data content. In some embodiments, the module 246 includes an electrical measurement module 248 to collect electrical measurements from one or more receivers (e.g., in response to power beacon signals), a feature vector module 250 to compute feature vectors based on the electrical measurements collected by the electrical measurement module 246, and/or machine learning classifier model(s) 264 that are trained to detect and/or classify foreign objects.

Each of the above-identified elements (e.g., modules stored in memory 206 of the RF charging pad 100) is optionally stored in one or more of the previously mentioned memory devices, and corresponds to a set of instructions for performing the function(s) described above. The above-identified modules or programs (e.g., sets of instructions) need not be implemented as separate software programs, procedures, or modules, and thus various subsets of these modules are optionally combined or otherwise rearranged in various embodiments. In some embodiments, the memory 206, optionally, stores a subset of the modules and data structures identified above.

Figure 2B:
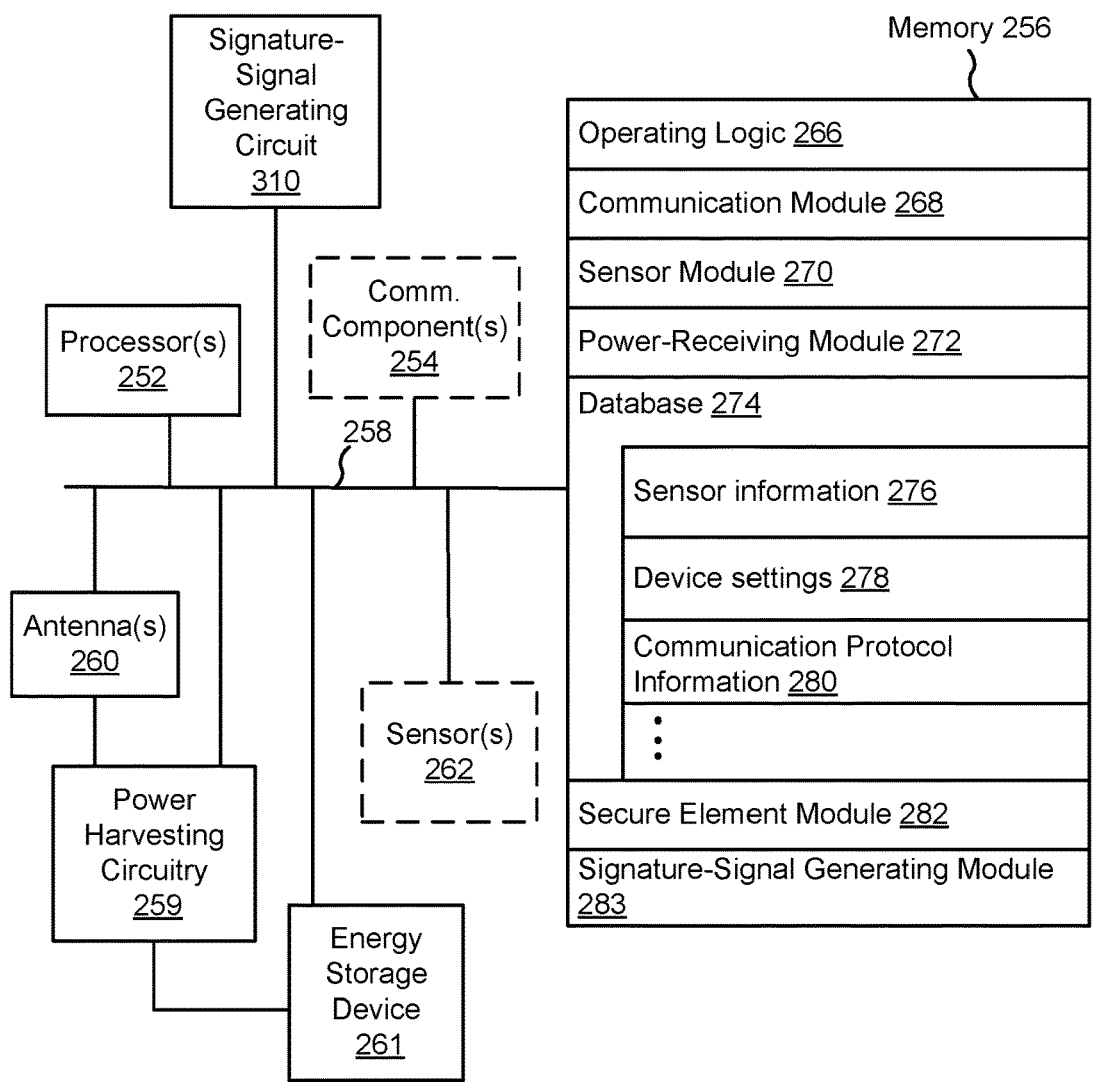
FIG. 2B is a block diagram illustrating an example receiver device, in accordance with some embodiments.

FIG. 2B is a block diagram illustrating a representative receiver device 104 (also sometimes called a receiver, power receiver, or wireless power receiver) in accordance with some embodiments. In some embodiments, the receiver device 104 includes one or more processing units (e.g., CPUs, ASICs, FPGAs, microprocessors, and the like) 252, one or more communication components 254, memory 256, antenna(s) 260, power harvesting circuitry 259, and one or more communication buses 258 for interconnecting these components (sometimes called a chipset). In some embodiments, the receiver device 104 includes one or more sensor(s) 262 such as the one or sensors 212 described above with reference to FIG. 2A. In some embodiments, the receiver device 104 includes an energy storage device 261 for storing energy harvested via the power harvesting circuitry 259. In various embodiments, the energy storage device 261 includes one or more batteries, one or more capacitors, one or more inductors, and the like.

In some embodiments, the power harvesting circuitry 259 includes one or more rectifying circuits and/or one or more power converters. In some embodiments, the power harvesting circuitry 259 includes one or more components (e.g., a power converter) configured to convert energy from power waves and/or energy pockets to electrical energy (e.g., electricity). In some embodiments, the power harvesting circuitry 259 is further configured to supply power to a coupled electronic device, such as a laptop or phone. In some embodiments, supplying power to a coupled electronic device include translating electrical energy from an AC form to a DC form (e.g., usable by the electronic device).

In some embodiments, the antenna(s) 260 include one or more of the meandering line antennas that are described in further detail in incorporated-by-reference PCT Patent Application No. PCT/US17/65886 (e.g., with reference to FIGS. 6A-7D, and elsewhere). In some embodiments, the antenna(s) 260 may also or alternatively include capacitive charging couplers (such as those described with reference to FIGS. 5A-5B of incorporated-by-reference U.S. patent application Ser. No. 16/045,637) that correspond in structure to those that may be present in a near-field charging pad.

In some embodiments, the receiver device 104 includes one or more output devices such as one or more indicator lights, a sound card, a speaker, a small display for displaying textual information and error codes, etc. In some embodiments, the receiver device 104 includes a location detection device, such as a GPS (global positioning satellite) or other geo-location receiver, for determining the location of the receiver device 103.

In various embodiments, the one or more sensor(s) 262 include one or more thermal radiation sensors, ambient temperature sensors, humidity sensors, IR sensors, occupancy sensors (e.g., RFID sensors), ambient light sensors, motion detectors, accelerometers, and/or gyroscopes. It is noted that the foreign object detection techniques disclosed herein operate without relying on the one or more sensor(s) 262.

The communication component(s) 254 enable communication between the receiver 104 and one or more communication networks. In some embodiments, the communication component(s) 254 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. It is noted that the foreign object detection techniques disclosed herein operate without relying on the communication component(s) 254.

The communication component(s) 254 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 256 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 256, or alternatively the non-volatile memory within memory 256, includes a non-transitory computer-readable storage medium. In some embodiments, the memory 256, or the non-transitory computer-readable storage medium of the memory 256, stores the following programs, modules, and data structures, or a subset or superset thereof:

Operating logic 266 including procedures for handling various basic system services and for performing hardware dependent tasks;

Communication module 268 for coupling to and/or communicating with remote devices (e.g., remote sensors, transmitters, receivers, servers, mapping memories, etc.) in conjunction with communication component(s) 254;

Sensor module 270 for obtaining and processing sensor data (e.g., in conjunction with sensor(s) 262) to, for example, determine the presence, velocity, and/or positioning of the receiver 103, a RF charging pad 100, or an object in the vicinity of the receiver 103;

Wireless power-receiving module 272 for receiving (e.g., in conjunction with antenna(s) 260 and/or power harvesting circuitry 259) energy from, capacitively-conveyed electrical signals, power waves, and/or energy pockets: optionally converting (e.g., in conjunction with power harvesting circuitry 259) the energy (e.g., to direct current): transferring the energy to a coupled electronic device; and optionally storing the energy (e.g., in conjunction with energy storage device 261);

Database 274, including but not limited to:
  Sensor information 276 for storing and managing data received, detected, and/or transmitted by one or more sensors (e.g., sensors 262 and/or one or more remote sensors);
  Device settings 278 for storing operational settings for the receiver 103, a coupled electronic device, and/or one or more remote devices; and
  Communication protocol information 280 for storing and managing protocol information for one or more protocols (e.g., custom or standard wireless protocols, such as ZigBee, Z-Wave, etc., and/or custom or standard wired protocols, such as Ethernet);

a secure element module 282 for providing identification information to the RF charging pad 100 (e.g., the RF charging pad 100 uses the identification information to determine if the wireless power receiver 104 is authorized to receive wirelessly delivered power); and a signature-signal generating module 283 used to control (e.g., in conjunction with a signature-signal generating circuit) various components to cause impedance changes at the antenna(s) 260 and/or power harvesting circuitry 259 to then cause changes in reflected power as received by a signature-signal receiving circuit 240.

Each of the above-identified elements (e.g., modules stored in memory 256 of the receiver 104) is optionally stored in one or more of the previously mentioned memory devices, and corresponds to a set of instructions for performing the function(s) described above. The above-identified modules or programs (e.g., sets of instructions) need not be implemented as separate software programs, procedures, or modules, and thus various subsets of these modules are optionally combined or otherwise rearranged in various embodiments. In some embodiments, the memory 256, optionally, stores a subset of the modules and data structures identified above. Furthermore, the memory 256, optionally, stores additional modules and data structures not described above, such as an identifying module for identifying a device type of a connected device (e.g., a device type for an electronic device that is coupled with the receiver 104).

In some embodiments, the near-field charging pads disclosed herein may use adaptive loading techniques to optimize power transfer. Such techniques are described in detail in commonly-owned and incorporated-by-reference PCT Application No. PCT/US17/65886 and, in particular, in reference to FIGS. 3A-8 and 12-15.

An Example Machine Learning Based Foreign Object Detection System

An example machine learning-based foreign object detection system (e.g., the RF charging pad 100) is described herein, according to some embodiments. The system detects and classifies foreign objects in close proximity to (e.g., less than a few centimeters or inches of) a wireless power transmission system. In some embodiments, the system detects and classifies foreign objects for a near-field wireless power transmission system that is configured to transmit wireless power over a range of distance that extends from 0) to 6 inches of a housing the houses components of the system, but may also be configured to transmit such power over a range of up to 1 meter (e.g., for mid-field transmission of power), or to a range that extends to a few feet away (e.g., for far-field transmission of power). In some embodiments, the detection system utilizes system features (e.g., load impedance or reactance, reflective power, magnetics, temperature) that are measured directly (e.g., reflective power detection) by the transmitter (e.g., by the electrical measurements module 248). In some embodiments, the detection system utilizes features that are measured indirectly (e.g. load voltage, load current) by the transmitter. The features are input to a machine learning model (e.g., the machine learning classifier models 264) to infer the classification of objects (sometimes called foreign objects: e.g., receiver, coins, credit cards, RFID tags).

In some embodiments, the classification of the objects along with the transmitter's charging policy are used to control the power transmission. The detection system identifies the objects and determines whether it is safe to transmit power to charge devices, and/or whether certain adjustments to the transmission of power are needed to ensure that safety is maintained (e.g., reducing power levels, changing directivity to avoid certain objects, etc.). In some embodiments, the detection system indicates (to a user) a presence of a foreign object that is obstructing a device. In some embodiments, the detection system indicates if the foreign objects are within close proximity (e.g., within 6 inches) of one or more charging zones. In some embodiments, the detection system detects and classifies objects within a charging zone as either a receiver, or a foreign object. In some embodiments, the detection system detects the absence (e.g., located beyond six inches) of objects in a charging zone. In some embodiments, the detection system detects objects between a receiver and a charging zone. In some embodiments, the detection system detects position of a receiver in a charging zone. In some embodiments, the detection system detects a charging state of a receiver in a charging zone. In some embodiments, the detection system detects and classifies objects in multiple charging zones. In some embodiments, the detection system determines a charging policy with respect to valid objects (e.g., receiver and business cards).

In some embodiments, the detection system uses self-calibration to adjust for temperature and/or wireless power hardware variations. In some embodiments, the detection system is calibrated during manufacturing for environmental conditions (e.g., board to board variations). In some embodiments, the detection system is calibrated for variations in components' tolerances. In some embodiments, the detection system is calibrated for manufacturing variability in antenna thickness, dielectric, etc. Such variations result in offsets or shifts of feature vector clustering. In some embodiments, calibration with reference objects, at the time of manufacturing (e.g., in a factory setting) is used to cancel out the offsets. In some embodiments, the calibration parameters are stored in non-volatile memory of the calibrated device.

In some embodiments, the detection system incorporates auto-calibration for fault tolerance (e.g., due to aging of devices or environmental changes). In some embodiments, the detection system incorporates an N-point calibration for normalization. In some embodiments, the detection system is calibrated by including unclassified objects. In some embodiments, the detection system is calibrated by excluding unclassified object classifications.

In some embodiments, the detection system detects devices for charging in the presence of safe objects (e.g., objects that are not harmed by the wireless power transmission). In some embodiments, the detection system disables charging and indicates error when unsafe objects (e.g., coins, paper clips, RFID tags, credit cards, metal) are present. In some embodiments, the detection system indicates active zones (i.e., zones where one or more objects are receiving power). In some embodiments, the detection system incorporates fault detection or handling (e.g., provide power back-off when unsafe objects are detected, provide alignment guide to guide user to resolve failure by removing objects, shifting receivers, etc.).

In wireless power transmission systems, the transmitter is designed to match the load impedance or reactance of the receiver for optimal power transfer. This impedance matching is affected by many factors, such as matching receiving and transmitting antenna, output load of receivers, antenna angle and position with respect to transmitter and receiver, obstructions between transmitter and receiver within the charging zones, temperature, and system to system variations (sometimes called wireless power hardware variations). These factors are either directly or indirectly observed as measurable electrical changes stimulated by a power beacon (e.g., short low power burst(s) sweeping over different power levels, frequency, position, etc. into a charging zone). In some embodiments, these electrical measurements (e.g., reflective power, forward power, drive current, drive voltage, temperature, etc.) are captured during the beacon and saved as a set of feature values. In some embodiments, the feature values are processed by the transmitter to yield a classification and decision. Selection of the features is critical to the classification performance. Each hardware architecture generates a different set of features which can be numerous, especially when different beacons are iterated over power, frequency and position.

FIGS. 3A-3F illustrate an example of the feature permutation for a hardware architecture. Not all features are optimal or useful for classification and often many combinations (of the features) are not obvious (for automatic inference). For example, in some orientations, a first object in the charging zone may appear to be another object (from the perspective of its impedance). FIGS. 3A-3F show a pair plot where each feature has been plotted against every other feature. The common labels are on the far left and near the bottom of the respective images. The features illustrated in FIGS. 3A-3F are various ADC values available in the hardware and the grouping represent different objects (ERX, NOLOAD, etc.). The colors (orange, and blue) corresponds to labels. In this case it is either a 'noload' (i.e., empty) or 'erx.' Although, in practice, there can be many clusters, FIGS. 3A-3F are simplified illustrations. In particular, some features were removed to show a more zoomed in view of the illustration. As illustrated, there are at least 7 features: adc1_0, adc2_0 (IdPA), adc3_0, adc4_0, pdet1_0 (power detector), pdet0_0, ts_0 (temperature), according to some embodiments. These 7 features are plotted against each other, so that there are 7×7 subplots. The middle diagonal is a distribution which can be ignored, since plotting a feature against itself doesn't have any meaning. The lower triangle (i.e., the triangle below the diagonal) is a mirror of the upper triangle (i.e., the triangle above the diagonal). So, as illustrated, there are really only 21 combinations: (all combinations—diagonal) divided by 2=(7×7−7)/2=21 combinations. Some subplots show very poor separation (e.g., adc1_0 vs adc4_0) between the different colors. This means that it is not easy to tell from those features if the 'label' is 'noload' or 'erx'. Some plots show separation of features, but there is no clear separation, because the result is dominated by a single feature (e.g., adc2_0 vs ts_0 (temperature)). Some features are easier for a software to categorize (e.g., adc2_0 (IdPA) vs pdet0_0 (power detector)) than other features. Some embodiments select features that show a high degree of separation.

Figure 3A:
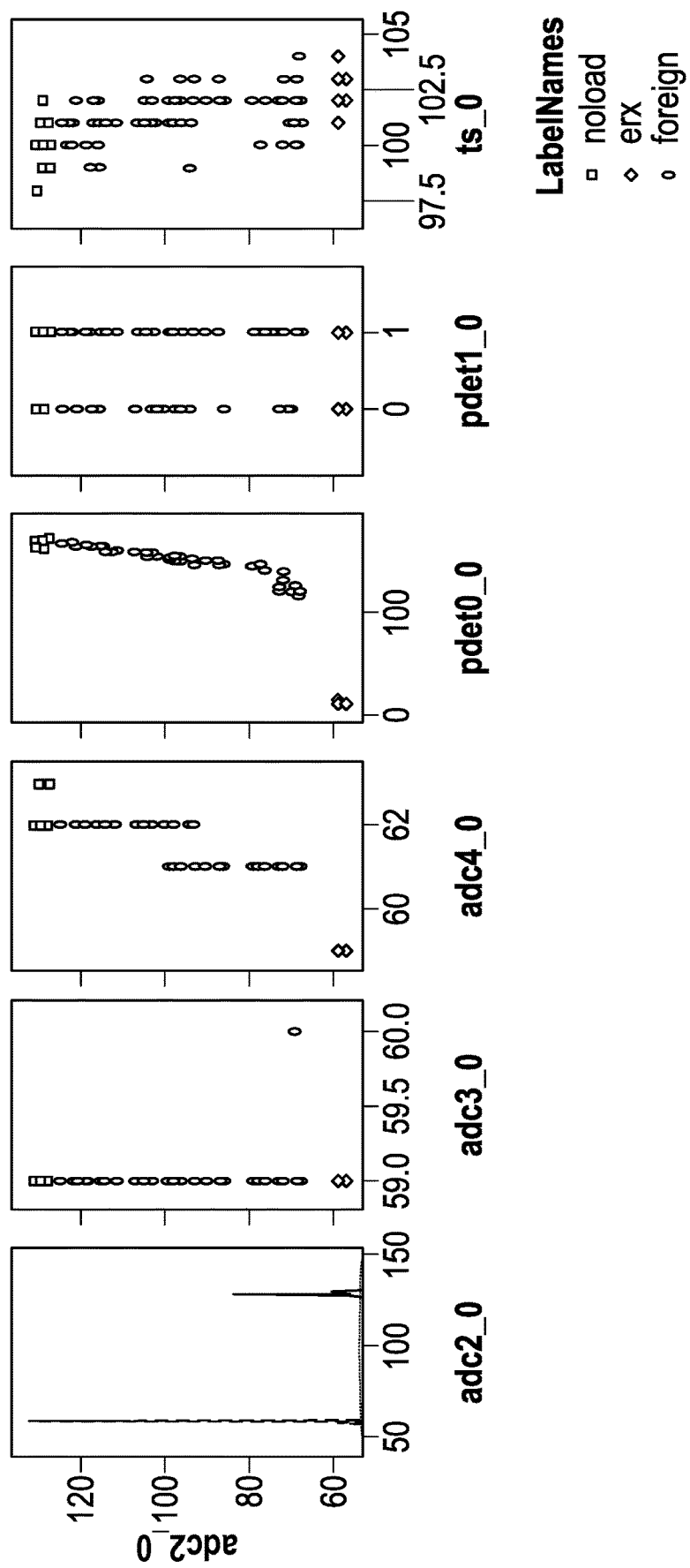
FIGS. 3A-3F illustrate an example of feature permutation for a hardware architecture, in accordance with some embodiments.
Figure 3B:
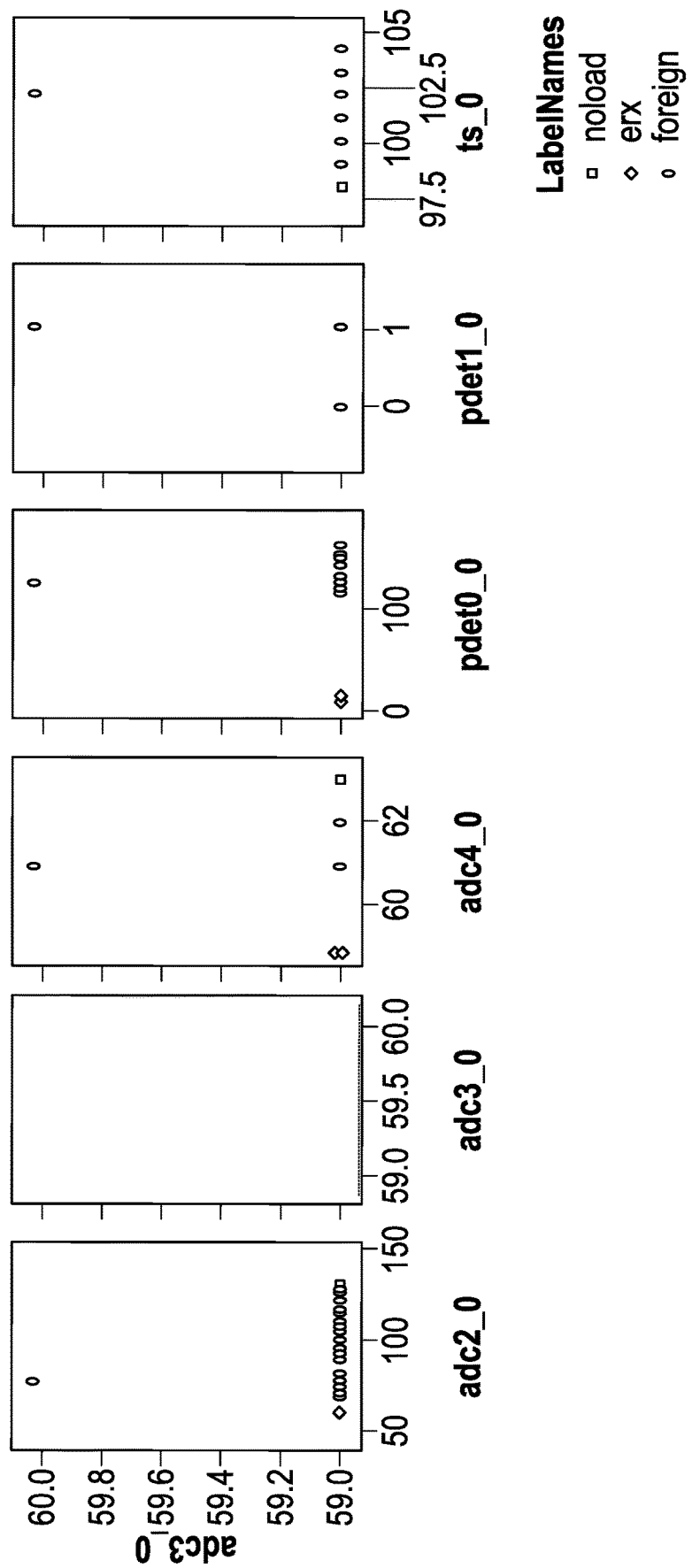
Figure 3C:
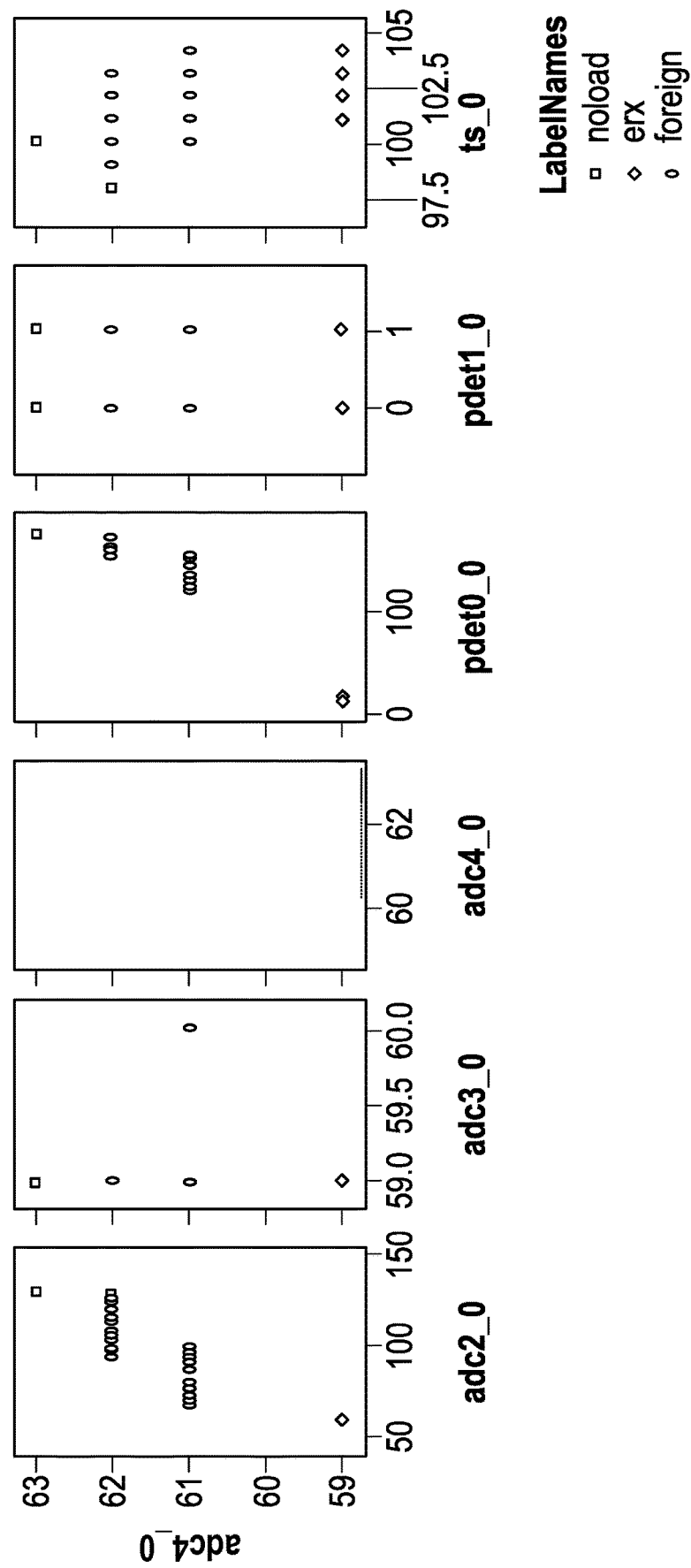
Figure 3D:
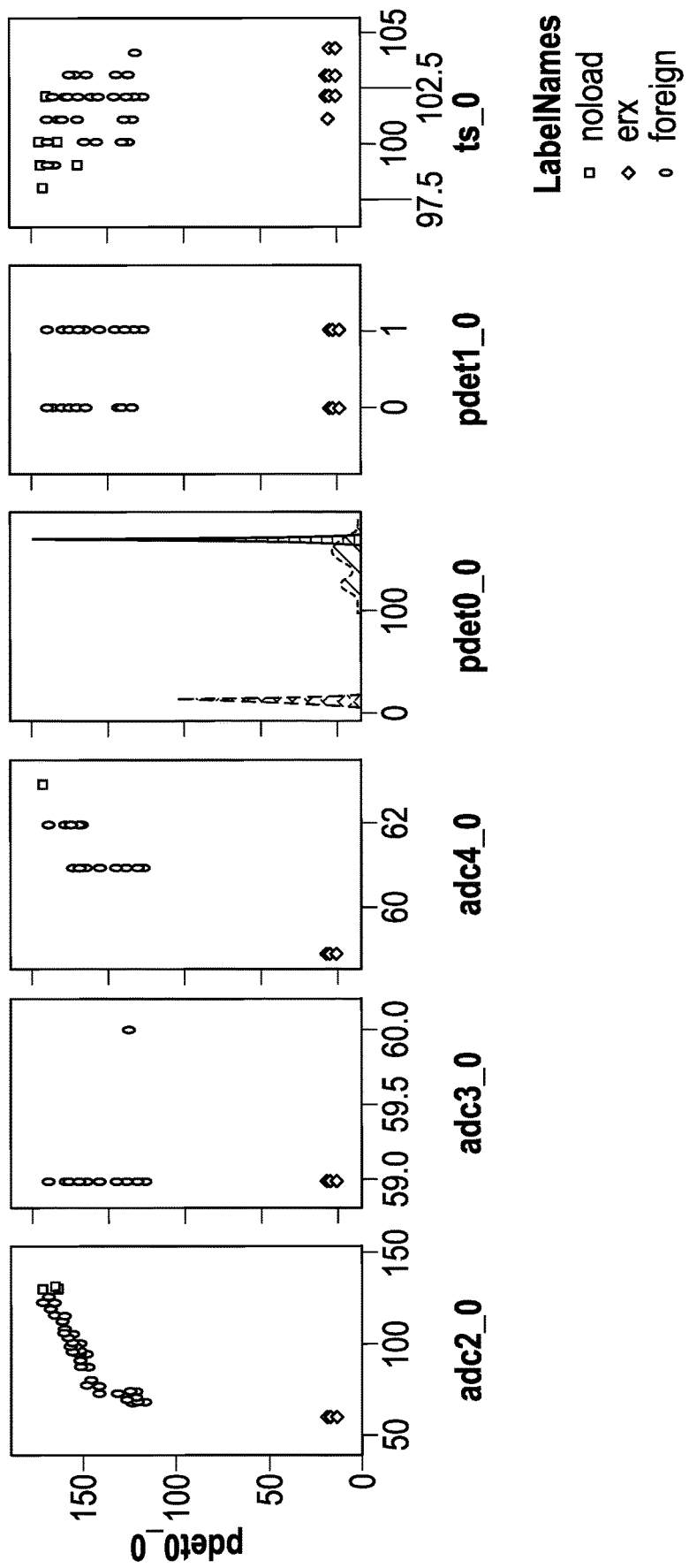
Figure 3E:
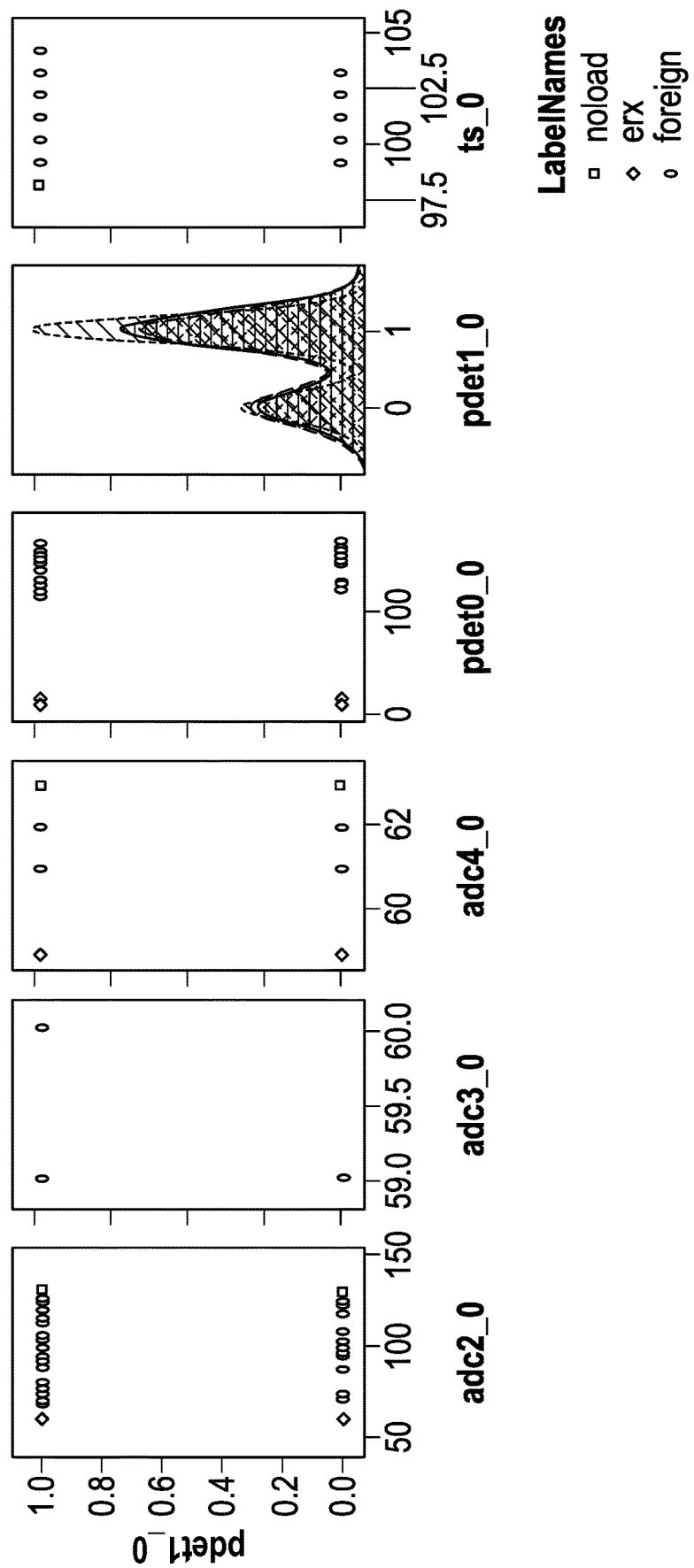
Figure 3F:
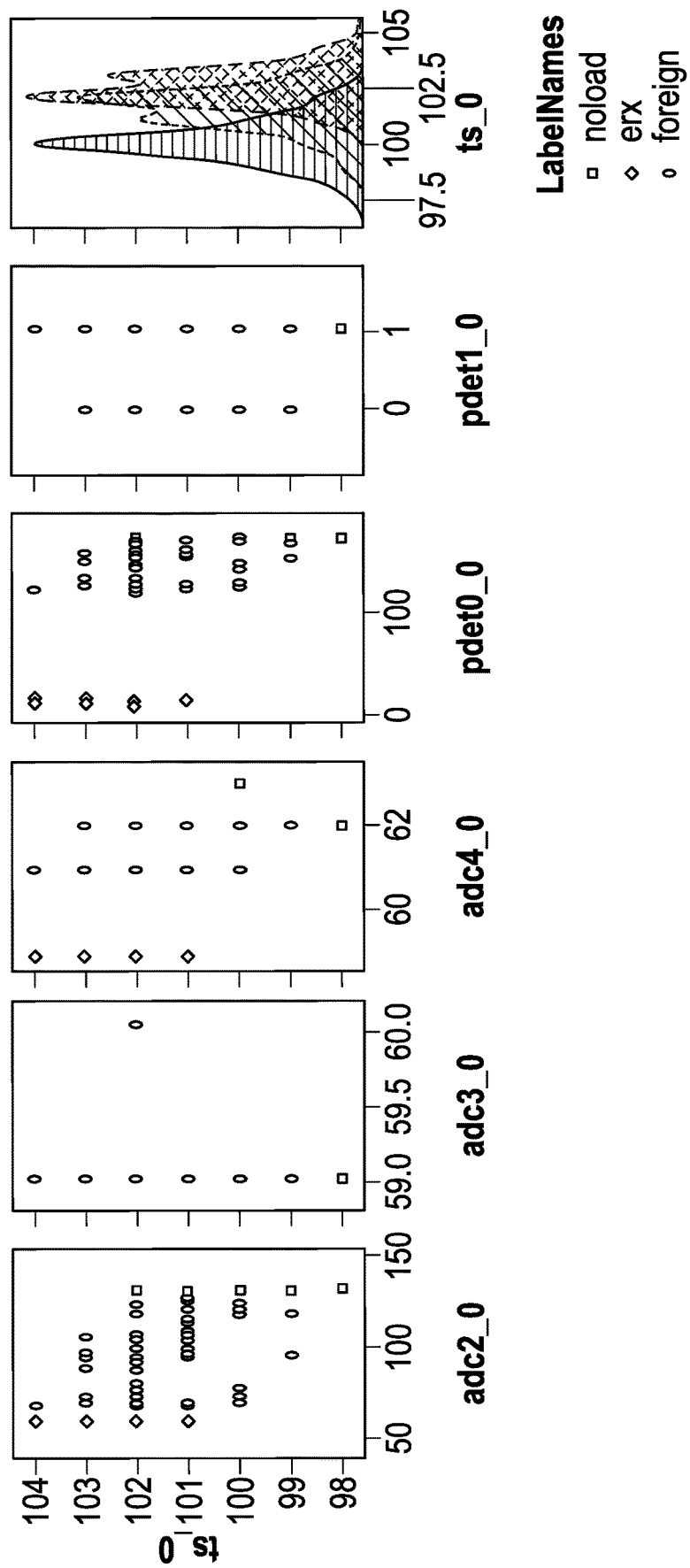
Figure 3G:
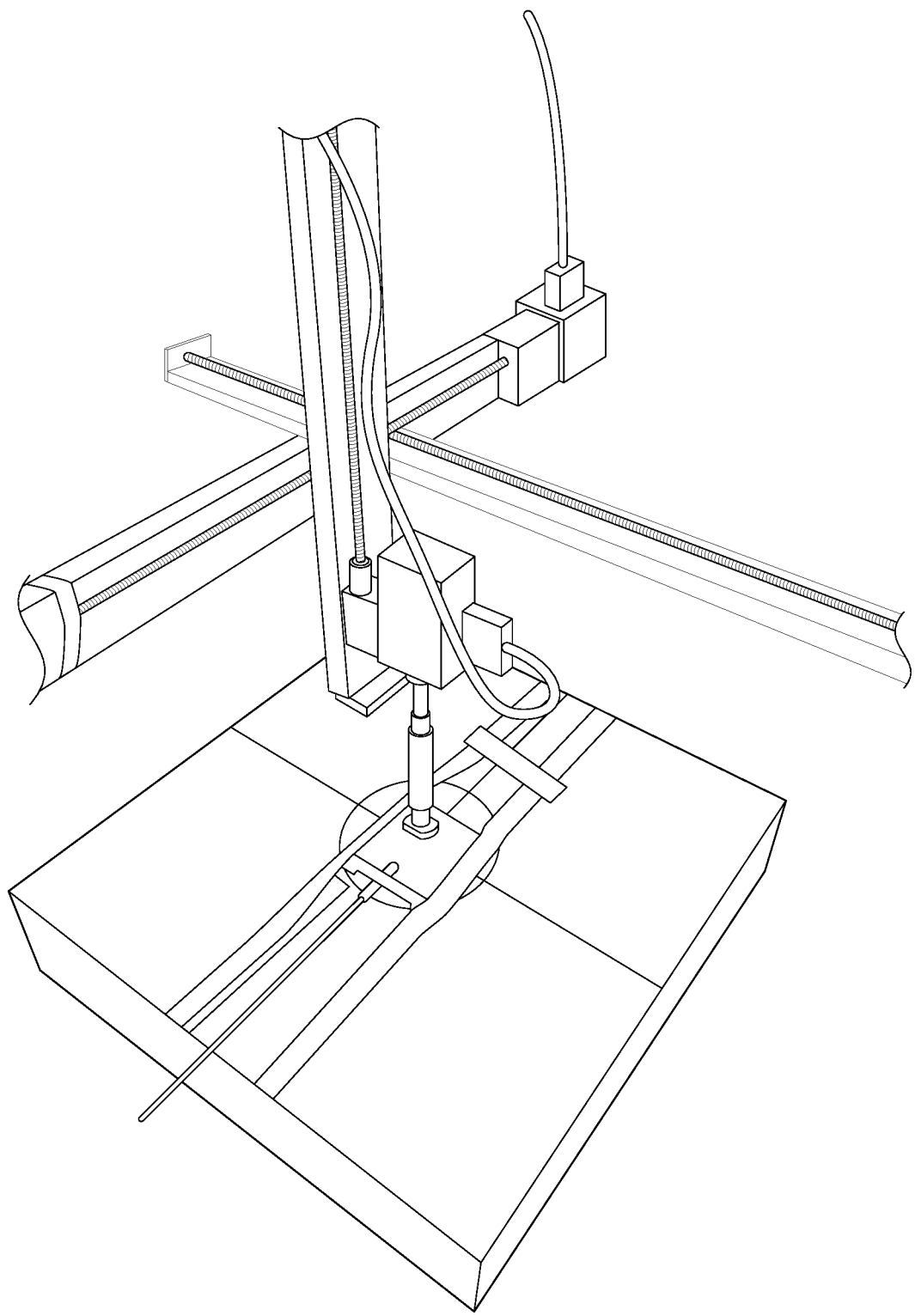
FIG. 3G illustrates an example robot gantry system used to collect data to train classifier models for detecting foreign objects, in accordance with some embodiments.

In some embodiments, the data collection process utilizes an automated gantry system, such as the system shown in FIG. 3G (e.g., a robot with 4-5 degrees of freedom), that iterates through a set of objects representing receiver, no-load, and various foreign objects placed in a charging zone. In some embodiments, the robot gantry system places an object at a predetermined position and orientation. Power is transmitted and signals or features are sampled. Optionally, the tests are run over temperature (sometimes called temperature cycling: e.g., by changing temperature in the environment using an oven) if compensation is required. In some embodiments, the sampled data is stored in a data warehouse. In some embodiments, a first object (e.g., a key, coin, or other type of foreign object) is swapped and another object (e.g., a different foreign object, such as a different key, different coin, or another type of foreign object) is placed and the sampling process is repeated. In some embodiments, multiple objects are placed or combined so as to train the machine learning models to detect the presence of more than one object. In some embodiments, the data collection process includes sweep or cycling of several features (e.g., power, frequency, zones, and antenna detune). In some embodiments, the data collection process includes feature unrolling (i.e., each feature in a separate column in a table of features). In some embodiments, the data collection process includes sweep sequencing of features.

The data collected is sampled into a labeled data set. In some embodiments, the collected data sets are aggregated and then processed by feature selection algorithms that look for features with the highest correlation. In some embodiments, data features are selected from the aggregated data set by both standard feature selection algorithms and by a tester or a developer (a user) using standard visualization tools (e.g., cluster visualization tools). In some embodiments, the process is iterated or repeated several times for better performance.

Figure 3H:
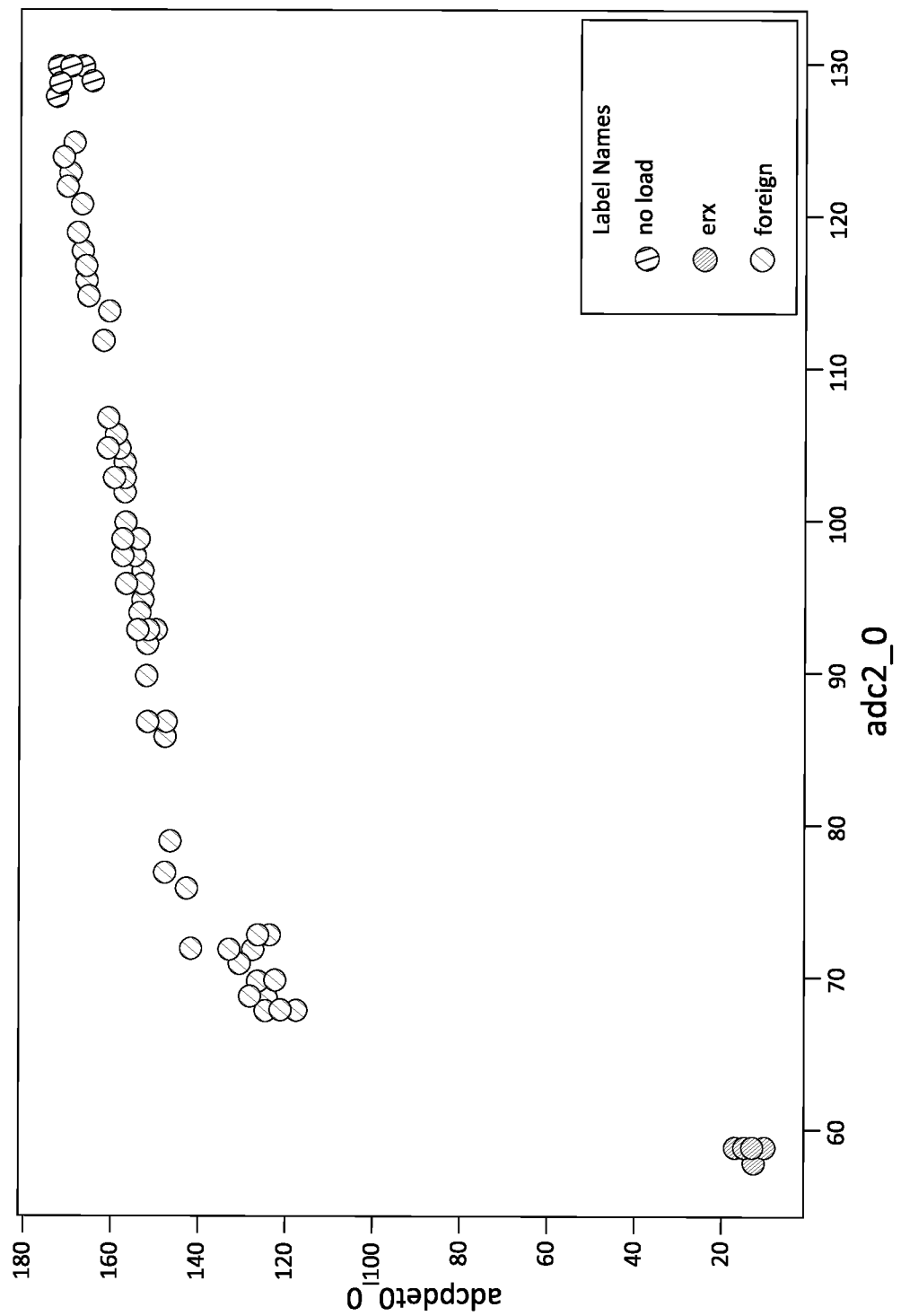
FIG. 3H illustrates a set of selected features (electrical measurements) and the results of classification by a classifier based on the selected features, in accordance with some embodiments.

FIG. 3H illustrates a set of features selected by the above process. The x-axis and the y-axis each corresponds to a selected feature. The selected features show the most correlation to change in impedance, according to some embodiments. Once the features are selected, the data features are used in a supervised training of a set of candidate machine learning models that are evaluated for their performance. In some embodiments, other factors, such as robustness and ease of calibration, are also considered during model selection. Once models are trained, the models are integrated into the detection system. In some embodiments, the detection system employs multiple machine learning models, each model tuned to detect and/or classify objects in specific zones. In some embodiments, results from multiple models are combined. In some instances, it is easier to combine results from multiple simpler models than to design a more complex model. In some embodiments, the detection system employs multiple machine learning models, each model tuned to detect and/or classify specific types of objects.

Figure 3I:
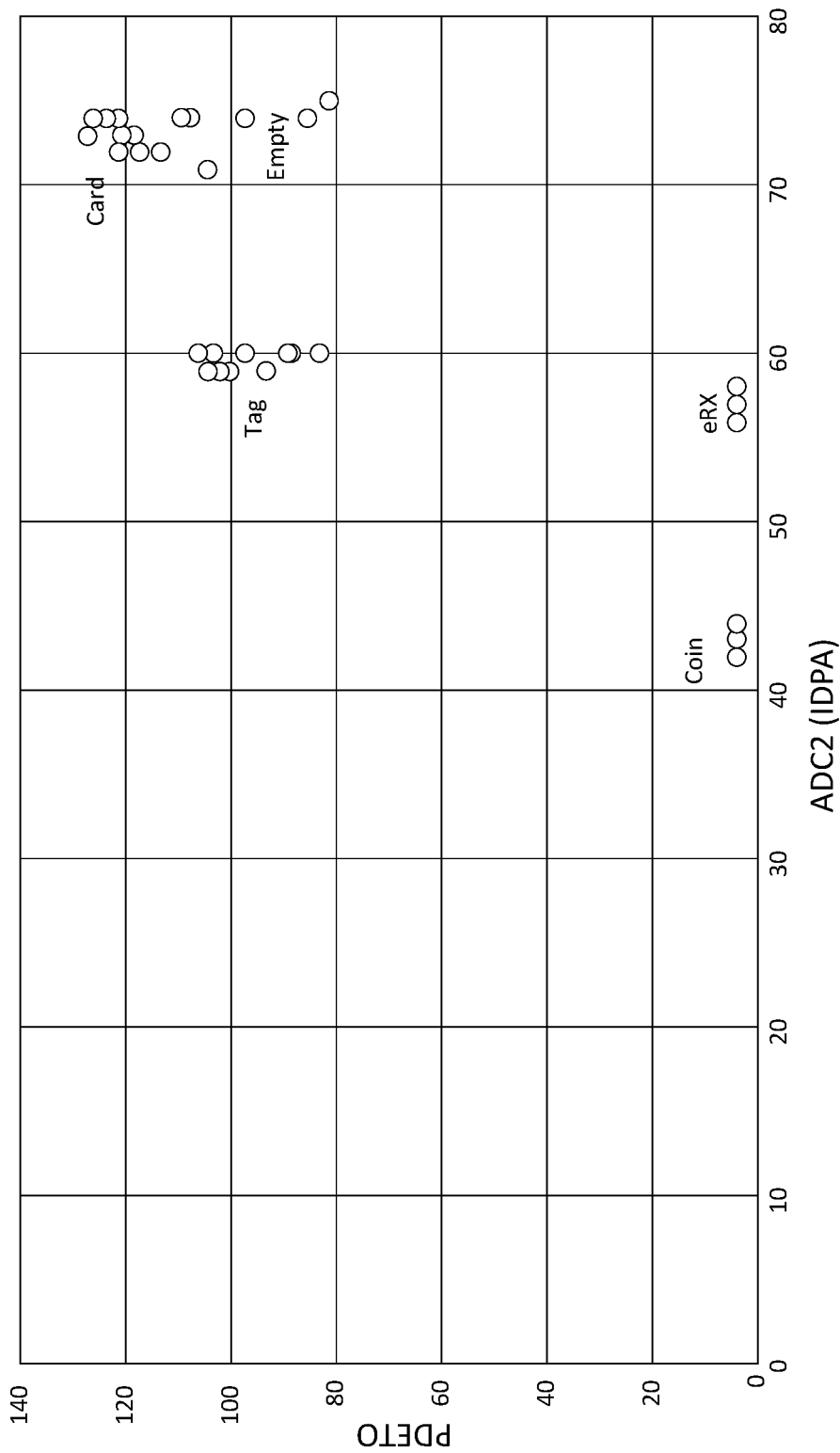
FIG. 3I illustrates a set of selected features (electrical measurements) and the results of classification by another classifier based on the selected features, in accordance with some embodiments.

In some embodiments, a KMeans algorithm (or classifier) classifies known and unknown objects based on the selected features. For example, in FIG. 3H, the different shades in the plot indicate classification, by a KMeans classifier, of different types of objects (no load, erx or receiver objects, and foreign objects), according to some embodiments. No load corresponds to absence of receivers and foreign objects in the zone. By way of experimentation, in some embodiments, a KMeans classifier is chosen to classify known and unknown objects, or to classify and/or to detect objects distinct from a known set of objects. In some embodiments, the KMeans classifier is used to detect specific devices for charging. In some embodiments, a k-nearest neighbors classifier (k-NN classifier) classifies specific set of objects, as illustrated in FIG. 3I, according to some embodiments. As shown in FIG. 3I, the k-NN classifier identifies a coin, a receiver (indicated as eRX), a tag (or a RFID tag), a card (e.g., a credit card), and, in some instances, the fact that the charging zone is empty (i.e., no objects are present), according to some embodiments.

In some embodiments, the sample data (sometimes called the data set) is split into a training set and a test set. The machine learning model is trained with different hyper-parameters using the training set, and the model's performance is evaluated with the test set. This process is repeated until a tuned model with the desired level of performance is created. The model is subsequently integrated and deployed in the detection system.

Figure 4:
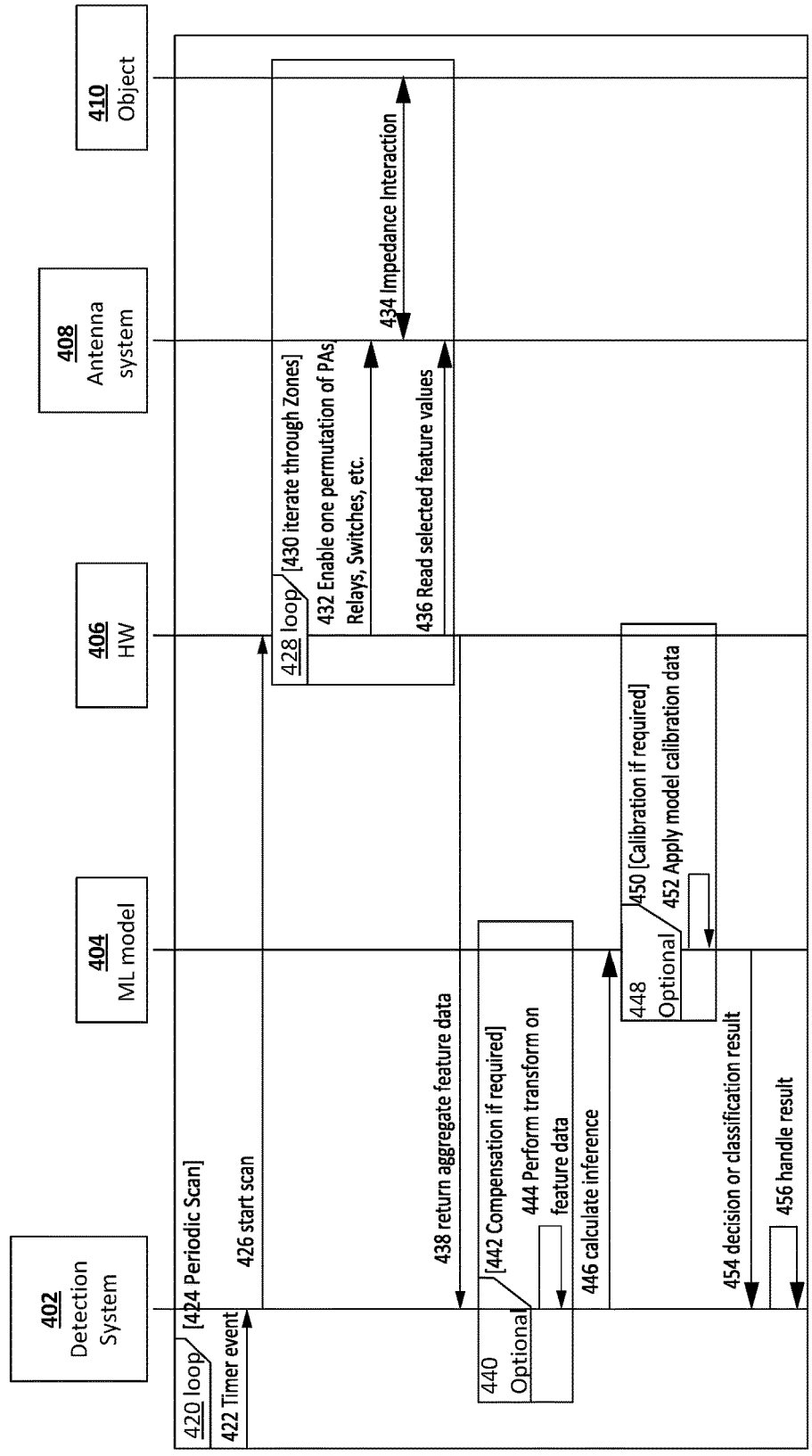
FIG. 4 is a sequence diagram of a machine learning-based foreign object detection system, in accordance with some embodiments.

FIG. 4 is a sequence diagram of a machine learning-based foreign object detection system 400, in accordance with some embodiments. The foreign object detection system 400 operates in a loop (420) detecting and/or classifying objects in one or more charging zones. A power transmission hardware (HW) 406 (e.g., the RF charging pad 100, FIG. 1B) operates in a continuous loop (428), iterating (430) through different permutations (432) of power amplifier (PA) zones (sometimes called charging zones), power levels, switches, frequency, etc. The HW 406 enables the antenna system 408 to transmit power (sometimes called power beacons, beacons, or beacon signals) using the transmission parameters (corresponding to each permutation) during each iteration. The HW 406 also samples (436), from the antenna system 408 (e.g., which includes the antennas 210, FIG. 1B), analog readings from the selected set of features representing key hardware points in the system. The impedance interaction between the antenna system 408 and the object 410 is indicated by the label 434 (e.g., this impedance interaction involves the PA IC 161A receiving impedance measurements from various measurement points along one or more of the PAs 108). The HW module 406 returns (438) aggregate feature data (i.e., a collection of feature data at the end of the loop 428) to the detection system 402 (described above in reference to FIGS. 3A-3I). Optionally (440), the detection system 402 transforms (444) the sample data (sometimes called the feature data or the aggregate feature data), if required, to compensate (442) for environmental variations (e.g., board to board variations). In some embodiments, the transforming is performed by the RF IC 160, but certain operations can also be performed by the PA IC 161A in certain embodiments or circumstances.

Subsequently, the detection system 402 calculates (446) inference (i.e., detects and/or classifies objects) by inputting the feature data to the trained machine learning model 404 (described above). The machine learning model 404 returns (454) decision or classification result. The detection system 402 handles (456) or uses the result from the machine learning model 404 to drive higher level system behavior, such as to generate user alerts, to determine charging levels for objects, etc. In some embodiments, the detection system 402 and the ML model 404 reside on the RF IC 160, and these also operate based on the measurements received via the PA IC 161A.

In some embodiments, the machine learning model 404 optionally (448) applies (450) calibration (e.g., feature scaling, normalization of data) if required. In some embodiments, the machine learning model 404 applies (452) model calibration data. In some embodiments, the calibration step is performed at the time of manufacturing (sometimes called factory calibration) of the wireless power transmission system (that incorporates the foreign object detection system). Sometimes a user of the system performs a calibration procedure to recalibrate the system. Some embodiments perform auto calibration during operation. For example, some embodiments use reinforcement learning where small deviations that were categorized as chargeable are used to adjust the models' accuracy as the devices age. To further illustrate, in some embodiments, after a receiver is detected, the wireless power transmission system communicates with the receiver (e.g., using Bluetooth LE) to establish that sufficient power is received from the transmitter, thereby indicating that the coupling between the wireless power transmission system and the receiver is effective. This in turn indicates that the concerned feature vector has provided a reference for a true positive detection result. This observation is used to reinforce or adjust the stored calibrated points. In some embodiments, as receiver devices age, calibration points shift slowly so the auto calibration is used to auto correct the behavior of the transmission system. As another example, when the device is able to charge, the transmitter can record shifts and increase the adjustments weighting towards the new shift for each successful charging. If the charge is unsuccessful, then the weighting is diminished to counter the adjustments.

Figure 5:
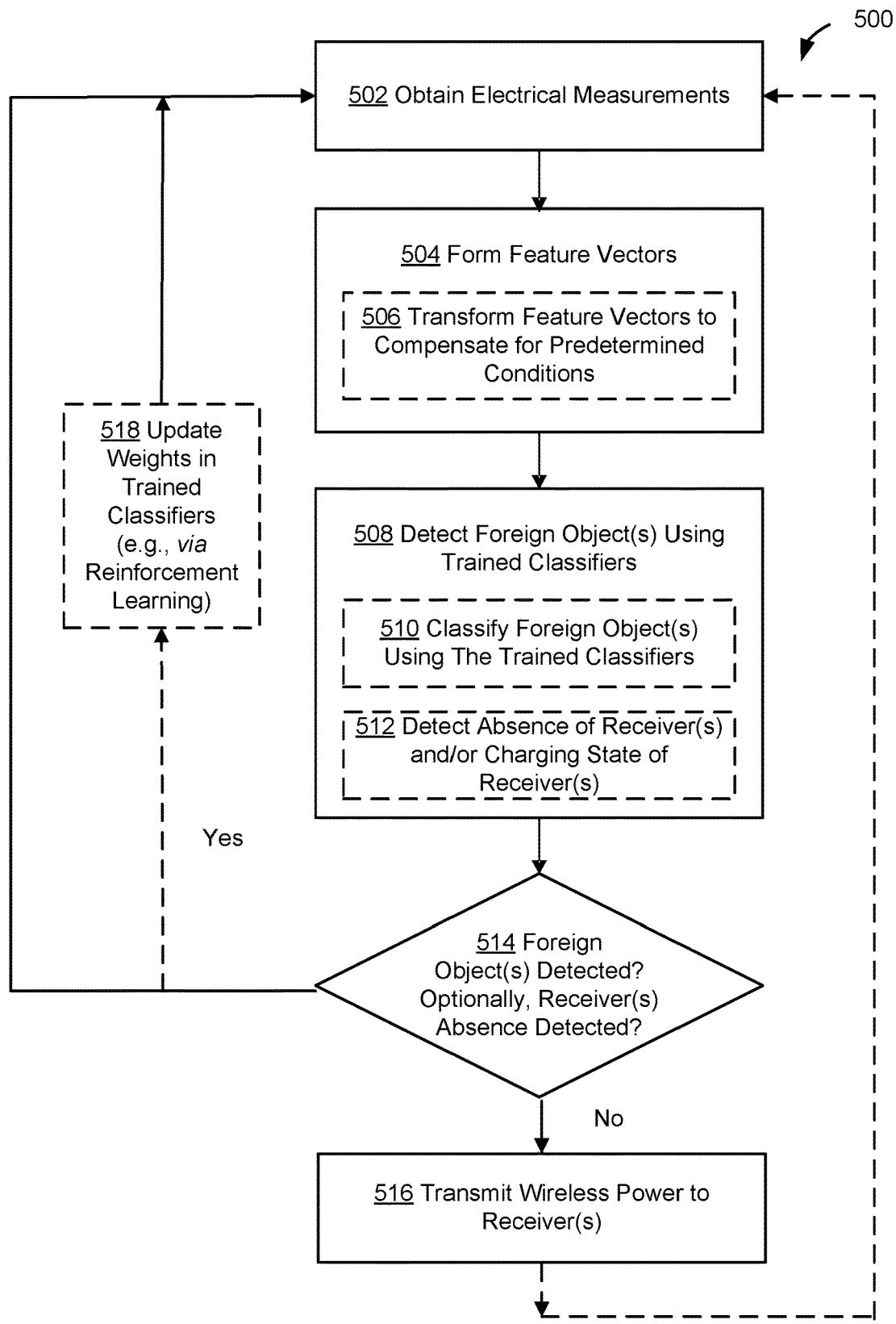
FIG. 5 is a flow diagram showing a process of detecting foreign objects (and receivers) using trained classifiers in accordance with some embodiments.

FIG. 5 is a flow diagram showing a process of detecting foreign objects (and receivers) using trained classifiers in accordance with some embodiments.

In some embodiments, a method 500 of detecting and classifying foreign objects is performed at a computer system (e.g., the system 100 as described above in reference to FIG. 2A, with the RF Power Transmitter IC 160 responsible for controlling operation of the method 500, based in part on the measurements received from the PA IC 161A). The computer system (e.g., the system 100) has one or more processors and memory storing one or more programs configured for execution by the one or more processors. The method includes obtaining (502) a plurality of electrical measurements (e.g., using the electrical measurements module 248, which operates in conjunction with the PA IC 161A) while a wireless-power-transmitting antenna (e.g., one of the antennas 210-A, . . . , 210-N) is transmitting different power beacons. The method also includes forming (504) a feature vector (e.g., by the feature vector module 250) according to the plurality of electrical measurements. The method further includes detecting (508) a presence of one or more foreign objects prior to transmitting wireless power to one or more wireless power receivers by inputting the feature vector to trained one or more classifiers (e.g., the classifier model(s) 264). Detecting presence can include detecting that the one or more foreign objects are located within a wireless-power-transmission range of the system, such as within a near-field wireless-power-transmission range of between 0 to 6 inches. Each classifier is a machine-learning model trained to detect foreign objects distinct from the one or more wireless power receivers. In some embodiments, the method includes determining (514) if foreign objects are detected and/or determining if receivers' absence is detected. In accordance with a determination that no foreign objects are detected and/or that receivers are present, the method further includes transmitting (516) power to the receivers. Example classifiers and the training processes are described above in the section titled "An Example Machine Learning Based Foreign Object Detection System."

In some embodiments, each classifier is further trained to classify (510) foreign objects, and the method further includes classifying the one or more foreign objects into one or more categories. FIG. 3I (described above) provides an example of a classifier that can classify objects into a known list of categories, according to some embodiments.

In some embodiments, at least one respective power beacon of the different power beacons is transmitted at each of a plurality of antennas zones. Each zone corresponds to a distinct charging area. In some embodiments, each zone has an associated transmitting antenna, and all of the zones form a wireless-power-transmission system. Each of the transmitting antennas is responsible for sending power to a respective distinct charging area. FIGS. 1B and 1C (described above) illustrate an antenna array 290) and transmission zones 290-1 through 290-N, according to some embodiments. In the example shown in FIGS. 1B and 1C, each antenna (e.g., antenna 210-A, 210-N) are configured to transmit power to a respective power transfer zone. The method includes obtaining a respective set of electrical measurements for each zone of the plurality of zones. The method also includes forming the feature vector comprises calculating a respective feature data for each set of electrical measurements, and aggregating each feature data to obtain the feature vector.

In some embodiments, the method further includes, prior to inputting the feature vector to the trained one or more classifiers, transforming (506) the feature vector (e.g., by the feature vector module 250) to compensate for a predetermined set of conditions including environmental differences between when training the one or more classifiers to detect foreign objects and when operating the one or more classifiers to detect foreign objects (e.g., temperature, or board-to-board variation).

In some embodiments, the method further includes, applying (518), at a first classifier of the one or more classifiers that has a first machine-learning model, reinforcement learning to adjust (or recalibrate) one or more weights used in the first machine-learning model upon determining that (i) the first classifier has detected a presence of the one or more foreign objects and (ii) wireless power received by the one or more wireless power receivers indicates that no foreign object is present.

In some embodiments, the trained one or more classifiers detect that the one or more foreign objects are present (e.g., within a near-field wireless power transmission range of 0-6 inches from an outer surface of a housing that houses the RF charging pad 100). The method further includes continuing to (i) obtain the plurality of electrical measurements, (ii) form the feature vector, and (iii) detect that the one or more foreign objects are present by inputting the feature vector to the trained one or more classifiers. The method further includes waiting to transmit wireless power to the one or more wireless power receivers until the one or more classifiers stop detecting that the one or more foreign objects are present.

In some embodiments, each of the different power beacons is transmitted in an iterative fashion at each of a plurality of zones. Each zone corresponds to a distinct charging area of the wireless power transmitting antenna. The method includes obtaining a first set of electrical measurements for a first zone of the plurality of zones. The method also includes waiting to transmit wireless power to the one or more wireless power receivers until the one or more classifiers stop detecting that the one or more foreign objects are present in the first zone. FIG. 1B (described above) illustrates antenna 210-A configured to transfer power to zone 2901-1 and antenna 210-N configured to transfer power to zone 290-N, according to some embodiments. The circuit 160 controls the antenna array to iterate over the plurality of zones, according to some embodiments.

In some embodiments, the plurality of electrical measurements are obtained (e.g., obtained via the PA IC 161A based on electrical measurements at one of the PAs 108) at predetermined time intervals.

In some embodiments, the plurality of electrical measurements include measurements of one or more of: load impedance, reflective power, forward power, drive current, drive voltage, magnetics, and temperature. FIGS. 3A-3F (described above) illustrate several features or electrical measurements aimed at training classifiers for detecting and classifying foreign objects.

In some embodiments, each classifier is trained to detect one or more of: coins, credit cards, and RFID tags. For example, FIG. 3I (described above) illustrates classification of objects, according to some embodiments.

In some embodiments, the one or more classifiers are further trained to detect (512) a presence of a first wireless power receiver. FIGS. 3A-3I (described above) provide examples of training classifiers, according to some embodiments. In some embodiments, the classifiers are trained to detect the presence of specific one or more receivers, and can also detect whether or not each receiver is authorized to receive wireless power from the system (to avoid allowing unauthorized receivers to leech power from the system). The method further includes transmitting wireless power to the first wireless power receiver. The method also includes, while transmitting the wireless power to the first wireless power receiver, continuing to (i) obtain the plurality of electrical measurements, (ii) form the feature vector, and (iii) detect that the first wireless power receiver is present by inputting the feature vector to the trained one or more classifiers. The method also includes ceasing to transmit wireless power from the wireless power transmitting antenna to the first wireless power receiver when the one or more classifiers stop detecting the presence of the first wireless power receiver.

In some embodiments, the one or more classifiers are further trained to detect (512) a charging state of a first wireless power receiver. To illustrate, when a receiver's battery charges (e.g., because the receiver received power from the wireless power transmission system), the load impedance of the battery changes. This will result in the feature vector to change as the battery charges reaches full capacity. The one or more classifiers are trained to detect this change thereby detecting a charging state of the receiver. The method further includes transmitting wireless power to the first wireless power receiver. The method also includes, while transmitting the wireless power to the first wireless power receiver, continuing to (i) obtain the plurality of electrical measurements, (ii) form the feature vector, and (iii) detect the charging state of the first wireless power receiver by inputting the feature vector to the trained one or more classifiers. The method also includes ceasing to transmit wireless power from the wireless power transmitting antenna to the first wireless power receiver when the one or more classifiers detect that the charging state of the first wireless power receiver has reached a predetermined threshold.

In some embodiments, each power beacon of the different power beacons is transmitted as a low power burst (e.g., an electromagnetic signal that has 50% of a power level used for transmission of wireless power to a receiving device) for a short period of time (e.g., lasts for less than 1 second, as compared to transmitting higher-power signals for minutes at a time while transmitting wireless power to a receiving device). In some embodiments, each power beacon of the different power beacons is transmitted using transmission parameters selected from a predetermined set of transmission parameters specifying at least a power level and a frequency.

In some embodiments, the one or more classifiers include a K-means classifier trained to detect the one or more wireless power receivers and to distinguish the one or more wireless power receivers from the one or more foreign objects. A K-means classifier is described above in reference to FIG. 3H, according to some embodiments.

In some embodiments, the one or more classifiers include a k-nearest neighbor (k-NN) classifier trained to classify the one or more wireless power receivers and the one or more foreign objects into at least one category of a plurality of categories of objects. A k-NN classifier is described above in reference to FIG. 3I, according to some embodiments.

In some embodiments, the wireless-power-transmitting antenna is one of a plurality of wireless-power transmitting antennas. Each wireless-power-transmitting antenna associated with a respective charging area. Each classifier of the one or more classifiers is trained to detect presence of the one or more foreign objects only in a respective charging area. The method includes detecting the presence of the one or more foreign objects by inputting a respective subset of features of the feature vector corresponding to a respective charging area to a respective classifier of the one or more classifiers that is trained to detect foreign objects in the respective charging area.

In some embodiments, each classifier of the one or more classifiers is trained to detect a respective class of foreign objects. The method includes detecting the presence of the one or more foreign objects by inputting the feature vector to each classifier to detect the presence of each class of foreign objects. In some embodiments, the one or more classifiers is further trained to detect a presence of foreign objects between the wireless power transmitting antenna and a first wireless power receiver. The method further includes continuing to obtain the plurality of electrical measurements to form the feature vectors to detect the presence of the first foreign objects between the wireless power transmitting antenna and the first wireless power receiver. The method also includes ceasing to transmit wireless power from the wireless power transmitting antenna to the first wireless power receiver until the one or more classifiers stop detecting the presence of the one or more foreign objects.

In some embodiments, the wireless power transmitting antenna is configured to match the load impedance of the one or more wireless power receivers for optimal power transfer.

In some embodiments, the wireless-power-transmitting antenna is a near-field transmitting antenna. For example, the system 100 (described above) illustrates antennas 210-A through 210-N. In some embodiments, the near-field transmitting antenna is configured to transmit at a center frequency of between 30-50 MHz. In some embodiments, the near-field transmitting antenna is further configured to transmit at a sufficient power level to deliver 20 watts of usable power to the receiver. 20 watts is a high power delivery range beyond current capabilities of inductive-based charging techniques.

In some embodiments, the one or more classifiers are trained to detect foreign objects according to a set of features that show the most correlation to changes in impedance values. For example, FIGS. 3A-3F (described above) illustrates several electrical measurements or features, and FIG. 3H illustrates two features that show the most correlation to change in impedance, according to some embodiments. In some embodiments, the set of features includes drive current power amplifier drive current and/or power detectors for reflective power. In some embodiments, the set of features includes FWD and/or power detectors for reflective power of multiple zones.

Figure 6A:
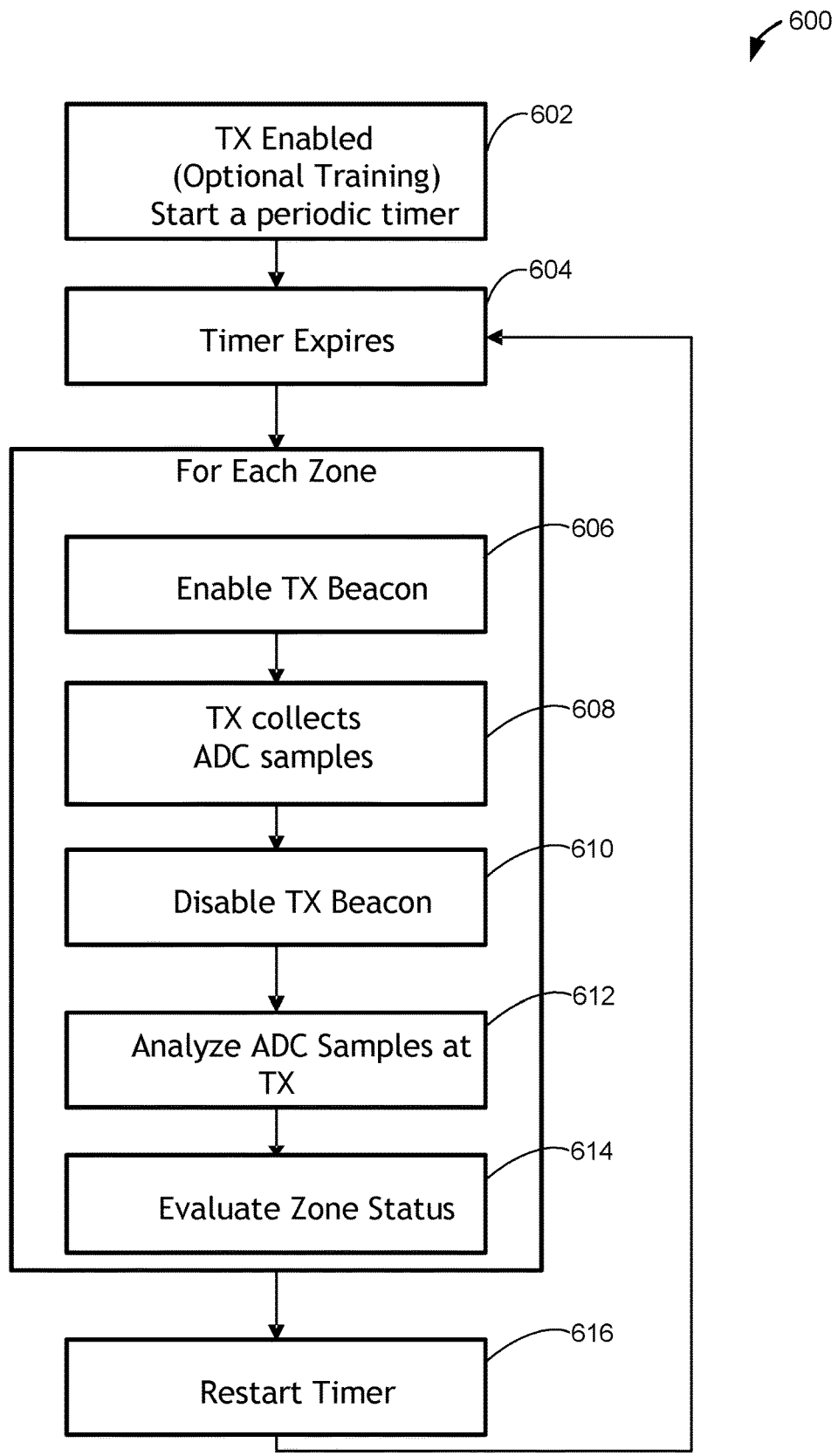
FIG. 6A is a flow diagram showing a process of detecting a receiver by sending beacon signals periodically in accordance with some embodiments.

FIG. 6A is a flow diagram 600 showing a process of using a trained classifier for detecting foreign objects in accordance with some embodiments that use a zone-based power transmission system (such as that shown in the example of FIG. 1B). Some embodiments detect a receiver 104 along with any foreign objects (such as keys, coins, or other objects that might be placed on or near the NF charging pad) by sending beacon signals (also referred to herein as "test power transmission signals") periodically. In some embodiments, each power-transfer zone 290 starts (602) a timer so as to send the beacon signals periodically. In some embodiments, when the timer expires (604), each power-transfer zone 290 of the NF charging pad (also referred to herein as an RF charging pad) 100 sends a respective beacon signal (606). In some embodiments, at step 608, a signature-signal circuit of the transmitter (e.g., a component capable of receiving analog signals (such as reflected power measurements after a beacon signal is transmitted and then some part of it is reflected back) and converting them to a digital representation that forms a signature representing a foreign object) determines signature-signals after transmitting the beacon signal (the signature-signals representing one or more receivers and/or one or more foreign objects). The transmitter beacon signal is disabled (610), the samples from ADC are analyzed (612) to help determine the signature-signals discussed above, and the zone status is evaluated (614) (e.g., as discussed with reference to FIG. 5). After the zone status is determined and the matching between each respective zone and the receiver 104 is evaluated, the timer is restarted (616) to start the next period for sending beacon signals. In this way, each zone of the system is able to determine those objects (receivers and/or foreign objects) located nearby and can determine whether to transmit wireless power and, if so, any adjustments that should be made to account for presence of any foreign objects. In some embodiments, the start step (602) is preceded by an optional training process as discussed with reference to FIG. 6B.

Figure 6B:
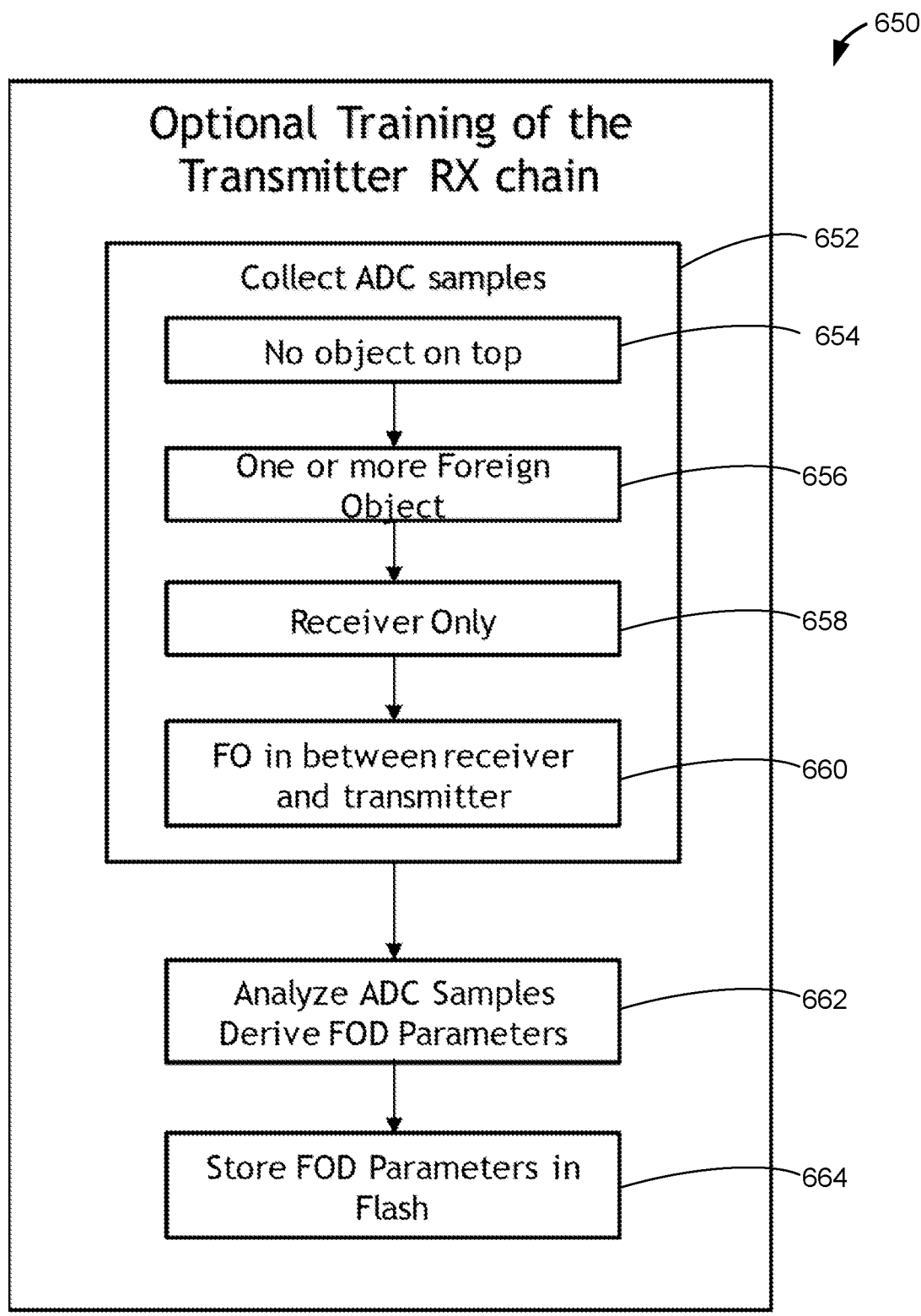
FIG. 6B is a flow diagram showing a process of optional training performed by a transmitter in accordance with some embodiments.

FIG. 6B is a flow diagram 650 showing a process of optional training performed by the power-transfer zone 290 in accordance with some embodiments. In some embodiments, optional training includes aiding foreign object detection (FOD) using signature-signal-based detection. In some embodiments, this can be done at one time with known sets of receivers and FOD devices. In some embodiments, enough ADC samples are collected (652) to enable classification of FOD, and the derived parameters provide the ability to classify the object detection status including (1) no object present (654), (2) one or more foreign objects present (654), (3) receiver only present (658), and (4) foreign object in between the receiver 104 and the power-transfer zone 290 (660). The process further includes analyzing (662) ADC samples to derive FOD parameters, and storing (664) the FOD in memory (e.g., in non-volatile memory). More details regarding example training or learning processes are described above in reference to FIG. 5, and can involve use of the gantry robot to allow for automation of the optional training process and enable training for many types of receivers and foreign objects in a short period of time.

All of these examples are non-limiting and any number of combinations and multi-layered structures are possible using the example structures described above.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A non-transitory, computer-readable storage medium storing instructions that, when executed by one or more processors of a wireless-power transmitter including a wireless-power-transmitting antenna, cause the wireless-power transmitter to perform operations, comprising:
    after the wireless-power transmitter has been enabled for a predetermined period of time, for each zone of a plurality of zones:
        enabling a beacon signal,
        obtaining a set of electrical measurements, wherein the set of electrical measurements includes measurements of a plurality of electrical features of an object;
        selecting, via a feature selection algorithm, two measurements from the set of electrical measurements having a highest object categorization performance when plotted against one another, wherein the two measurements are measurements of different electrical features;
        disabling the beacon signal, and
        determining, using a trained classifier configured to receive the set of electrical measurements, a zone status indicating presence of a foreign object within a respective zone of the plurality of zones, wherein the trained classifier is a clustering algorithm trained to classify known and unknown objects based on the two selected measurements;
    in accordance with a first zone status indicating that a foreign object is present within a first zone of the plurality of zones, forgo transmitting wireless power to one or more wireless power receivers within the first zone of the plurality of zones; and
    in accordance with a second zone status indicating an absence of a foreign object within a second zone of the plurality of zones, transmitting wireless power to one or more wireless power receivers within the second zone of the plurality of zones.

2. The non-transitory computer readable storage medium of claim 1, wherein obtaining the set of electrical measurements for each zone of the plurality of zones further comprises forming a respective feature vector for each set of electrical measurements.

3. The non-transitory computer readable storage medium of claim 2, wherein the instructions, when executed by the one or more processors of the wireless-power transmitter, cause the wireless-power transmitter to perform operations, further comprising:
    for each zone of a plurality of zones:
        continuing to (i) obtain the set of electrical measurements, (ii) form the respective feature vector, and (iii) determine a respective zone status by inputting the respective feature vector to the trained classifier; and waiting to transmit wireless power to the one or more wireless power receivers until the trained classifier stops detecting that the one or more foreign objects are present.

4. The non-transitory computer readable storage medium of claim 2, wherein forming the feature vector further comprises calculating a respective feature data for the set of electrical measurements, and aggregating the respective feature data to obtain the feature vector.

5. The non-transitory computer readable storage medium of claim 1, wherein the trained classifier includes a machine-learning model and applies reinforcement learning to adjust one or more weights used in the machine-learning model upon determining that (i) the trained classifier has detected the presence of the one or more foreign objects and (ii) wireless power received by the one or more wireless power receivers indicates that no foreign object is present.

6. The non-transitory computer readable storage medium of claim 1, wherein the trained classifier is further trained to classify the one or more foreign objects into one or more categories.

7. The non-transitory computer readable storage medium of claim 1, wherein the set of electrical measurements is obtained at predetermined time intervals.

8. The non-transitory computer readable storage medium of claim 1, wherein the set of electrical measurements include measurements of one or more of: load impedance, reflective power, forward power, drive current, drive voltage, magnetics, and temperature.

9. The non-transitory computer readable storage medium of claim 1, wherein the trained classifier detects one or more of: coins, credit cards, and radio-frequency identification (RFID) tags.

10. The non-transitory computer readable storage medium of claim 1, wherein the beacon signal is transmitted as a low power burst for a short period of time.

11. The non-transitory computer readable storage medium of claim 1, wherein the beacon signal is transmitted using transmission parameters selected from a predetermined set of transmission parameters specifying at least a power level and a frequency.

12. The non-transitory computer readable storage medium of claim 1, wherein the trained classifier includes a K-means classifier trained to detect the one or more wireless power receivers and to distinguish the one or more wireless power receivers from the one or more foreign objects.

13. The non-transitory computer readable storage medium of claim 1, wherein the trained classifier includes a k-nearest neighbor (k-NN) classifier trained to classify the one or more wireless power receivers and the one or more foreign objects into at least one category of a plurality of categories of objects.

14. The non-transitory computer readable storage medium of claim 1, wherein the wireless-power-transmitting antenna is configured to match load impedance of the one or more wireless power receivers for optimal power transfer.

15. The non-transitory computer readable storage medium of claim 1, wherein the wireless-power-transmitting antenna is a near-field transmitting antenna.

16. A wireless-power transmitter, comprising:
a wireless-power-transmitting antenna;
one or more processors; and
memory storing one or more programs that are configured for fer execution by the one or more processors, the one or more programs including instructions for:
after the wireless-power transmitter has been enabled for a predetermined period of time, for each zone of a plurality of zones:
enabling a beacon signal,
obtaining a set of electrical measurements, wherein the set of electrical measurements includes measurements of a plurality of electrical features of an object;
selecting, via a feature selection algorithm, two measurements from the set of electrical measurements having a highest object categorization performance when plotted against one another wherein the two measurements are measurements of different electrical features;
disabling the beacon signal, and
based on the two selected measurements, determining, using a trained classifier configured to receive the set of electrical measurements, a zone status indicating presence of a foreign object within a respective zone of the plurality of zones;
in accordance with a first zone status indicating that a foreign object is present within a first zone of the plurality of zones, forgo transmitting wireless power to one or more wireless power receivers within the first zone of the plurality of zones; and
in accordance with a second zone status indicating an absence of a foreign object within a second zone of the plurality of zones, transmitting wireless power to one or more wireless power receivers within the second zone of the plurality of zones.

17. The wireless-power transmitter of claim 16, wherein obtaining the set of electrical measurements for each zone of the plurality of zones further comprises forming a respective feature vector for each set of electrical measurements.

18. The wireless-power transmitter of claim 17, wherein the one or more programs stored in the memory further include instructions for:
for each zone of a plurality of zones:
continuing to (i) obtain the set of electrical measurements, (ii) form the respective feature vector, and (iii) determine a respective zone status by inputting the respective feature vector to the trained classifier; and
waiting to transmit wireless power to the one or more wireless power receivers until the trained classifier stops detecting that the one or more foreign objects are present.

19. A method of detecting and classifying foreign objects, comprising:
after a wireless-power transmitter including a wireless-power-transmitting antenna has been enabled for a predetermined period of time, for each zone of a plurality of zones of the wireless-power transmitter:
enabling a beacon signal,
obtaining a set of electrical measurements, wherein the set of electrical measurements includes measurements of a plurality of electrical features of an object;
selecting, via a feature selection algorithm, two measurements from the set of electrical measurements having a highest object categorization performance when plotted against one another, wherein the two measurements are measurements of different electrical features;

disabling the beacon signal, and based on the two selected measurements, determining, using a trained classifier configured to receive the set of electrical measurements, a zone status indicating presence of a foreign object within a respective zone of the plurality of zones;

in accordance with a first zone status indicating that a foreign object is present within a first zone of the plurality of zones, forgo transmitting wireless power to one or more wireless power receivers within the first zone of the plurality of zones; and in accordance with a second zone status indicating an absence of a foreign object within a second zone of the plurality of zones, transmitting wireless power to one or more wireless power receivers within the second zone of the plurality of zones.

20. The method of claim 19, wherein obtaining the set of electrical measurements for each zone of the plurality of zones further comprises forming a respective feature vector for each set of electrical measurements.

* * * * *

UNITED STATES PATENT AND TRADEMARK OFFICE
CERTIFICATE OF CORRECTION

PATENT NO. : 12,418,327 B2  
APPLICATION NO. : 18/522082  
DATED : September 16, 2025  
INVENTOR(S) : Howard Chan et al.

Page 1 of 1

It is certified that error appears in the above-identified patent and that said Letters Patent is hereby corrected as shown below:

On the Title Page

On Page 11, Column 1 (item (56) Other Publications), Line 10, after "pgs.", insert --¶Energous Corp., IPRP, PCT/US2015/067279, Jul. 4, 2017, 7 pgs.--.

In the Specification

In Column 15 (Description of Embodiments), Line 41, delete "pockets:" and insert --pockets;-- therefor.
In Column 15 (Description of Embodiments), Line 43, delete "current):" and insert --current);-- therefor.
In Column 16 (Description of Embodiments), Line 37, delete "0)" and insert --0-- therefor.
In Column 16 (Description of Embodiments), Line 52, delete "objects:" and insert --objects;-- therefor.
In Column 18 (Description of Embodiments), Line 53, delete "cycling:" and insert --cycling;-- therefor.
In Column 21 (Description of Embodiments), Line 54, delete "290)" and insert --290-- therefor.
In Column 22 (Description of Embodiments), Line 40, delete "2901-1" and insert --290-1-- therefor.

In the Claims

In Column 28, Line 5, in Claim 16, delete "fer".
In Column 28, Line 18, in Claim 16, after "another", insert --,-- therefor.

Signed and Sealed this  
Tenth Day of February, 2026

John A. Squires  
*Director of the United States Patent and Trademark Office*